United States Patent
Mizuguchi et al.

(10) Patent No.: US 12,118,422 B2
(45) Date of Patent: Oct. 15, 2024

(54) PERSONAL IDENTIFICATION MEDIUM

(71) Applicant: TOPPAN PRINTING CO., LTD., Tokyo (JP)

(72) Inventors: Yoshiyuki Mizuguchi, Tokyo (JP); Koji Matsui, Tokyo (JP); Naomichi Mimita, Tokyo (JP); Satoko Takahashi, Tokyo (JP); Yuko Masunaga, Tokyo (JP); Shin Kataoka, Tokyo (JP); Yu Kokubo, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 773 days.

(21) Appl. No.: 17/157,578

(22) Filed: Jan. 25, 2021

(65) Prior Publication Data

US 2021/0150303 A1     May 20, 2021

Related U.S. Application Data

(63) Continuation of application No. PCT/JP2019/031404, filed on Aug. 8, 2019.

(30) Foreign Application Priority Data

Aug. 8, 2018 (JP) ................................. 2018-149196
Aug. 8, 2018 (JP) ................................. 2018-149197

(51) Int. Cl.
*G06K 19/077* (2006.01)
*B32B 27/08* (2006.01)
(Continued)

(52) U.S. Cl.
CPC ........ *G06K 19/07773* (2013.01); *B32B 27/08* (2013.01); *B32B 27/365* (2013.01);
(Continued)

(58) Field of Classification Search
CPC ............ B32B 2451/00; B32B 2425/00; B32B 2307/412; B32B 2307/402;
(Continued)

(56) References Cited

U.S. PATENT DOCUMENTS

2013/0264390 A1* 10/2013 Frey .......................... C23F 1/02
235/492
2013/0277432 A1* 10/2013 Katworapattra ...........................
G06K 19/07745
235/488
(Continued)

FOREIGN PATENT DOCUMENTS

| JP | 3263760 B | 12/2001 |
|---|---|---|
| WO | WO2012/050223 A1 | 4/2012 |
| WO | WO 2017/014258 A1 | 1/2017 |

OTHER PUBLICATIONS

International Search Report (Form PCT/ISA/210); mailed Oct. 15, 2019 in corresponding International Patent Application No. PCT/JP2019/031404; (4 pages).

*Primary Examiner* — David R Dunn
*Assistant Examiner* — Christopher E Veraa
(74) *Attorney, Agent, or Firm* — STAAS & HALSEY LLP

(57) ABSTRACT

A personal identification medium is provided that includes a decorative layer provided with an antenna, and a laser marking layer in which a personal information marking portion is marked on the decorative layer, where the antenna includes a non-decorative portion and a decorative portion connected to the non-decorative portion, and the personal information marking portion formed on the laser marking layer overlaps at least a portion of the decorative portion formed on the decorative layer.

7 Claims, 17 Drawing Sheets

(51) Int. Cl.
 *B32B 27/36* (2006.01)
 *G06K 19/07* (2006.01)
(52) U.S. Cl.
 CPC ... *G06K 19/0723* (2013.01); *G06K 19/07722* (2013.01); *B32B 2250/05* (2013.01); *B32B 2307/306* (2013.01); *B32B 2307/402* (2013.01); *B32B 2307/412* (2013.01); *B32B 2425/00* (2013.01); *B32B 2451/00* (2013.01)
(58) Field of Classification Search
 CPC .......... B32B 2307/306; B32B 2250/05; B32B 27/365; B32B 27/08; G06K 19/07722; G06K 19/0723; G06K 19/07773
 See application file for complete search history.

(56) References Cited

U.S. PATENT DOCUMENTS

| | | | |
|---|---|---|---|
| 2013/0344298 A1* | 12/2013 | Haas | B42D 25/00 524/106 |
| 2015/0298484 A1* | 10/2015 | Motoi | B41J 2/47 347/225 |
| 2015/0376841 A1* | 12/2015 | Schaede | D21H 27/36 162/124 |
| 2017/0197452 A1* | 7/2017 | Philippe | B32B 27/304 |
| 2018/0194158 A1* | 7/2018 | Ayala | G06K 19/07773 |
| 2018/0207974 A1* | 7/2018 | Urata | B41M 5/26 |
| 2018/0290478 A1* | 10/2018 | Sugdon | B42D 25/455 |
| 2018/0304666 A1* | 10/2018 | Brunet | G06K 19/025 |
| 2019/0092080 A1* | 3/2019 | Sugdon | B42D 25/351 |

\* cited by examiner

PERSONAL IDENTIFICATION MEDIUM

CROSS REFERENCE TO RELATED APPLICATIONS

This application is a continuation application based on a PCT Patent Application No. PCT/JP2019/031404, filed Aug. 8, 2019, whose priority is claimed on Japanese Patent Applications No. 2018-149196 filed Aug. 8, 2018 and No. 2018-149197 filed Aug. 8, 2018, the entire contents of which are hereby incorporated by reference.

BACKGROUND OF THE INVENTION

Field of the Invention

The present invention relates to a personal identification medium for presenting personal information such as a passport or an ID card.

Description of the Related Art

In recent years, as personal identification media such as passports and ID cards, media capable of non-contact communication by incorporating a communication member including an antenna and an IC chip (module) are increasing.

Conventionally, a method has been known in which a hologram foil or the like is attached to ID information such as a face photograph for showing the identity of the person on a personal identification medium such as a passport or an ID card in order to prevent forgery or alteration of the photograph (see Japanese Patent No. 3263760 and the like).

Holograms cannot be manufactured without advanced technology and equipment. Therefore, with such a method, even if falsification is performed such that the hologram of the ID information is peeled off and replaced with invalid ID information, it is difficult to tamper with the hologram. Therefore, falsification of ID information can be reduced.

However, with the above-described configuration, it is not possible to prevent forgery by scraping from the lower side, deleting the ID information, and falsifying the ID information while leaving the hologram located at the upper portion of the ID information as it is.

In addition, recently, it is also known that a material that can be marked with a laser is used instead of a facial photograph to form or mark ID information with a laser and a hologram foil is provided on the ID information (see PCT Publication No. 2012/050223 and the like).

By doing so, it is possible to make it difficult to replace the ID information itself. However, in recent years, printing technology and the like have been developed, and ID information that looks similar to ID information marked by the original laser can be prepared and used as a replacement.

Therefore, a technology capable of preventing an attack from the back surface of the personal identification medium is required.

SUMMARY OF THE INVENTION

The present invention provides a personal identification medium that has a non-contact communication function and is used for personal identification that marks personal information such as a face photograph that is difficult to forge and falsify. In particular, a personal identification medium capable of preventing forgery and falsification due to cutting from the lower layer side is provided.

The first aspect of the present invention is a personal identification medium, including a decorative layer provided with an antenna, and a laser marking layer in which a personal information marking portion is marked on the decorative layer, where the antenna includes a non-decorative portion and a decorative portion connected to the non-decorative portion, and the personal information marking portion formed on the laser marking layer overlaps at least a portion of the decorative portion formed on the decorative layer.

In the second aspect of the present invention, in the personal identification medium according to the first aspect, it is preferable that the antenna is a patterned metal thin-film layer.

In the third aspect of the present invention, the personal identification medium according to the first aspect is preferably a metal winding.

A fourth aspect of the present invention is a personal identification medium, including a decorative layer provided with a decorative portion, and a laser marking layer in which a personal information marking portion is marked on the decorative layer, where the personal information marking portion formed on the laser marking layer overlaps at least a portion of the decorative portion formed on the decorative layer.

In the fifth aspect of the present invention, the personal identification medium according to the fourth aspect preferably further includes an antenna and the antenna is a patterned metal thin-film layer.

In the sixth aspect of the present invention, the personal identification medium according to the fourth aspect preferably further includes an antenna and the antenna is preferably a metal winding.

In the seventh aspect of the present invention, in the personal identification medium according to any one of the fourth to sixth aspects, the decorative layer preferably further includes an antenna portion, and the personal information marking portion overlaps a portion of the antenna portion.

In the eighth aspect of the present invention, in the personal identification medium according to any one of the first to seventh aspects, it is preferable that a colored layer is provided between the decorative layer and the laser marking layer, the colored layer includes a colored portion and a window portion, the window portion is formed in an area overlapping the decorative portion formed on the decorative layer, and the personal information marking portion formed on the laser marking layer overlaps the decorative portion via the window portion.

In the ninth aspect of the present invention, in the personal identification medium according to the eighth aspect, it is preferable that the personal information marking portion is formed so as to straddle the window portion and the colored portion of the colored layer.

In the tenth aspect of the present invention, it is preferable that in the personal identification medium according to the eighth or ninth aspect, a filling layer is preferably formed on the window portion.

In the eleventh aspect of the present invention, the personal identification medium according to any one of the first to tenth aspects preferably includes a light transmissive energy resistant layer between the colored layer and the decorative layer.

In the twelfth aspect of the present invention, in the personal identification medium according to the eleventh aspect, the light transmissive energy resistant layer is preferably both or one of an infrared absorption and scattering layer and a heat resistant layer.

In the thirteenth aspect of the present invention, in the personal identification medium according to any one of the first to twelfth aspects, it is preferable that a light transmissive hologram layer is further provided on the laser marking layer in which the personal information marking portion is marked, and the light transmissive hologram layer is formed so as to cover at least a personal information marking portion.

According to the present invention, it is possible to provide a personal identification medium in which personal information that is difficult to forge or modify is marked. In particular, it is possible to confirm the trace when forgery and falsification is performed by cutting away from the lower layer side.

DETAILED DESCRIPTION OF THE PREFERRED EMBODIMENTS

The present invention relates to a booklet such as a passport for certifying an identity such as a passport or an ID card, and a personal identification medium having a non-contact communication function used as an ID card.

First Embodiment

Figure 1:
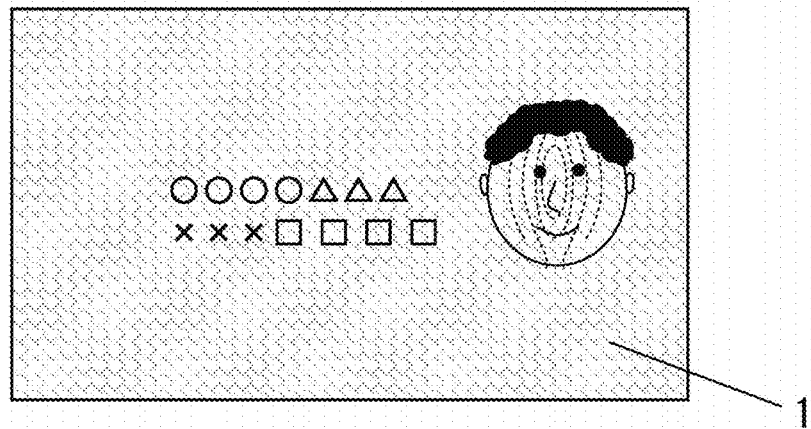
FIG. 1 is a top view showing an example of a personal identification medium according to the first embodiment of the present invention.
Figure 2:
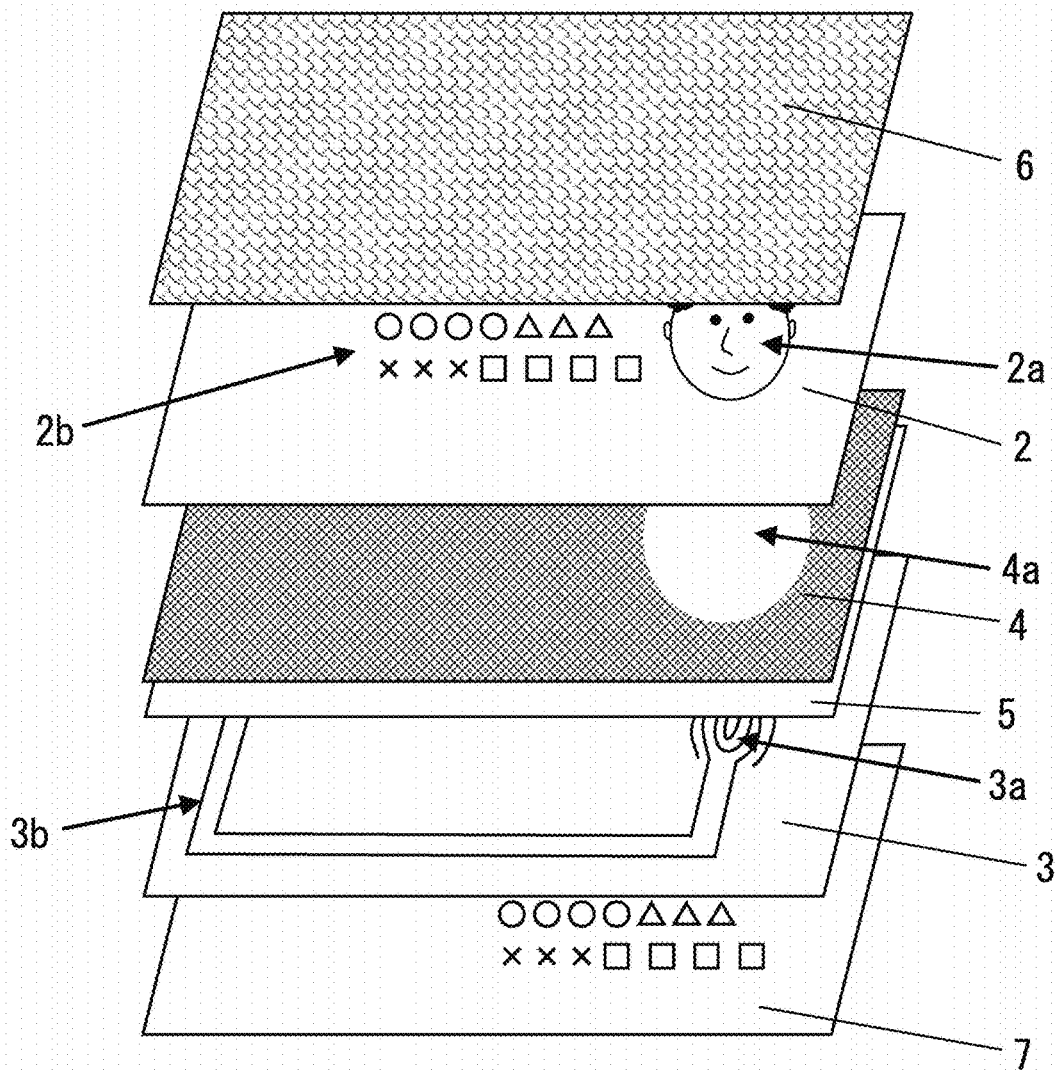
FIG. 2 is a schematic view showing an example of a personal identification medium according to the first embodiment of the present invention.

FIG. 1 shows a top view of an example in which an ID card is used as a specific example of the personal identification medium of the present invention, and FIG. 2 shows a schematic view showing an outline of a layer structure of the ID card of FIG. 1.

In FIGS. 1 and 2, an antenna having a decorative portion formed as a personal information marking portion, which is printed information such as a face photo information, name, and a number by laser marking and a patterned metal thin-film layer formed so as to overlap the lower layer of the face photo information.

With such a configuration, even if the personal information marking portion can be deleted from the back surface by cutting and another ID information can be provided, the decorative portion of the antenna is also destroyed. Therefore, it can be visually confirmed from the destroyed state of the decorative portion of the antenna that there was an unauthorized modification of personal information, and it also can be confirmed that there was an unauthorized modification of personal information due to the disconnection of the antenna, which made non-contact communication impossible.

Figure 3:
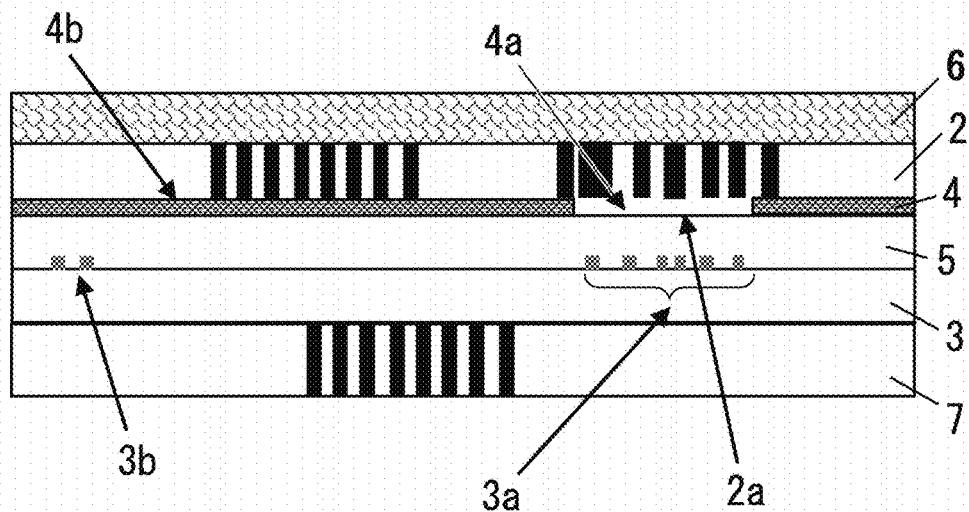
FIG. 3 is a cross-sectional view showing an example of a personal identification medium according to the first embodiment of the present invention.
Figure 4:
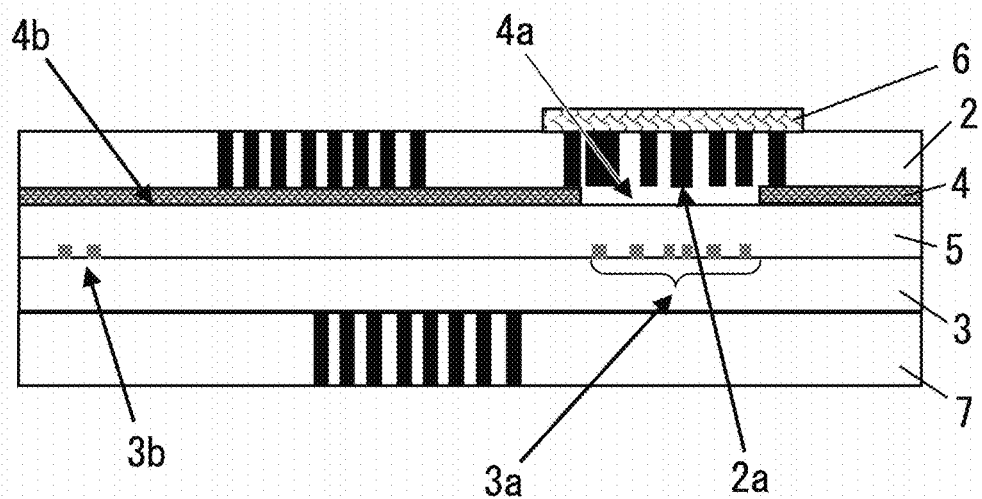
FIG. 4 is a cross-sectional view showing an example of a personal identification medium according to the first embodiment of the present invention.
Figure 5A:
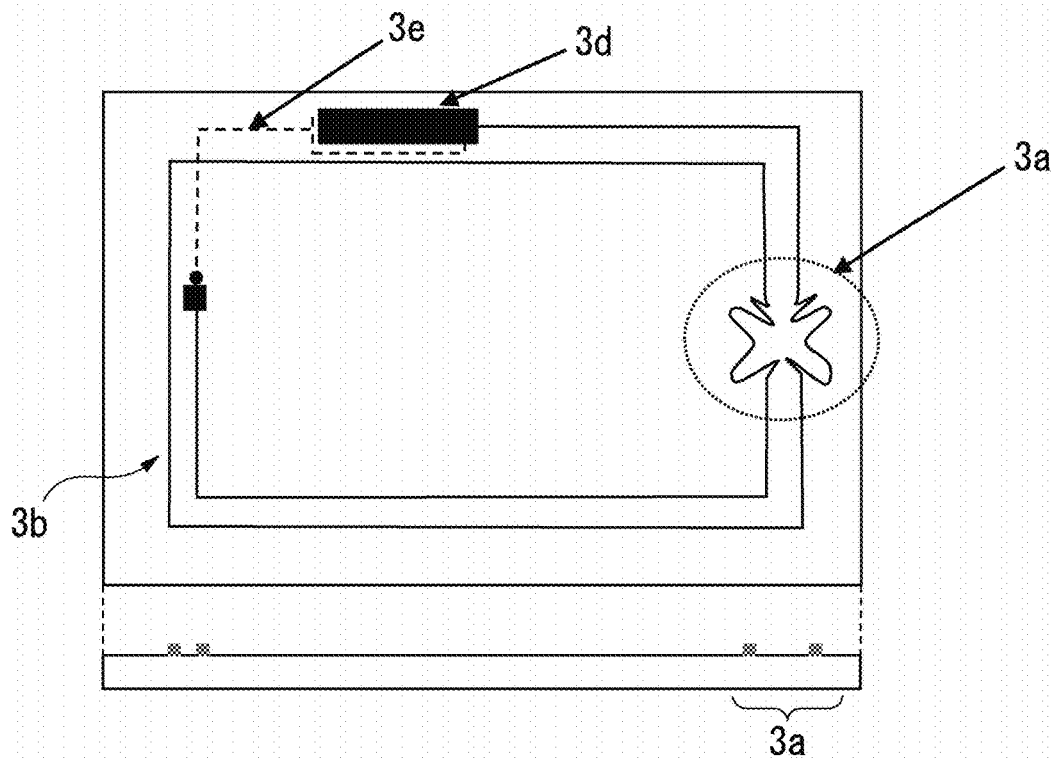
FIG. 5A is a schematic view showing an example of an antenna according to the first embodiment of the present invention.
Figure 5B:
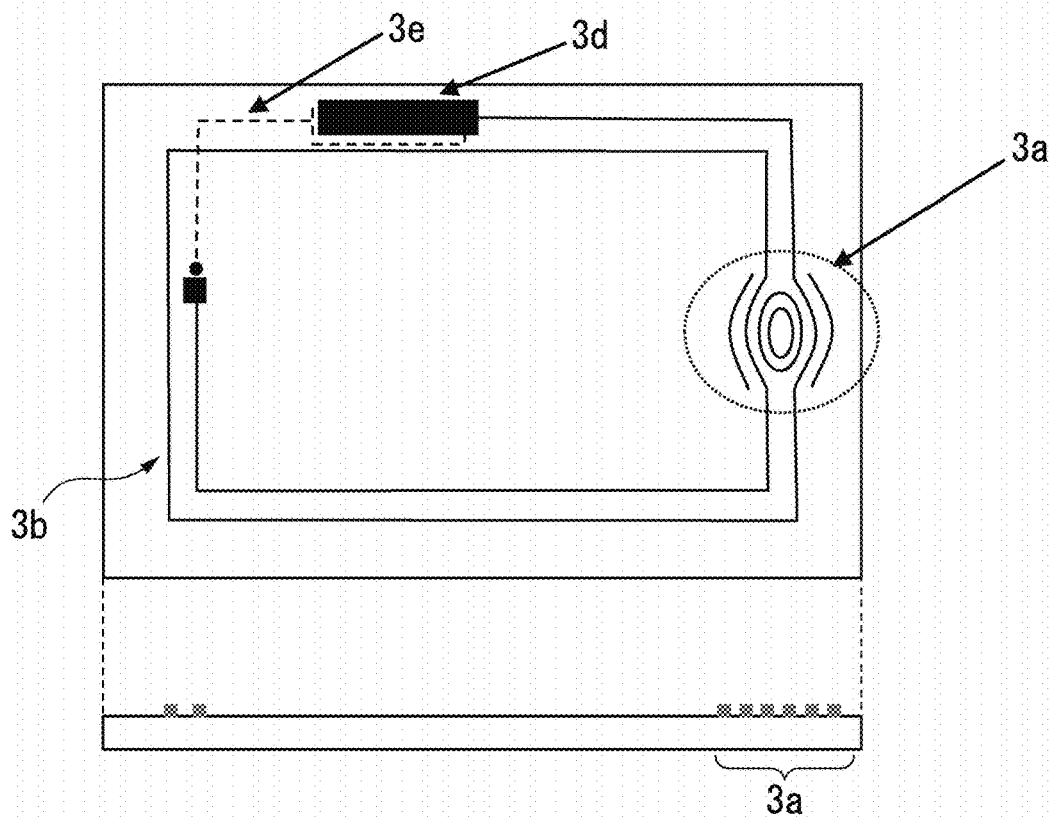
FIG. 5B is a schematic view showing an example of an antenna according to the first embodiment of the present invention.
Figure 5C:
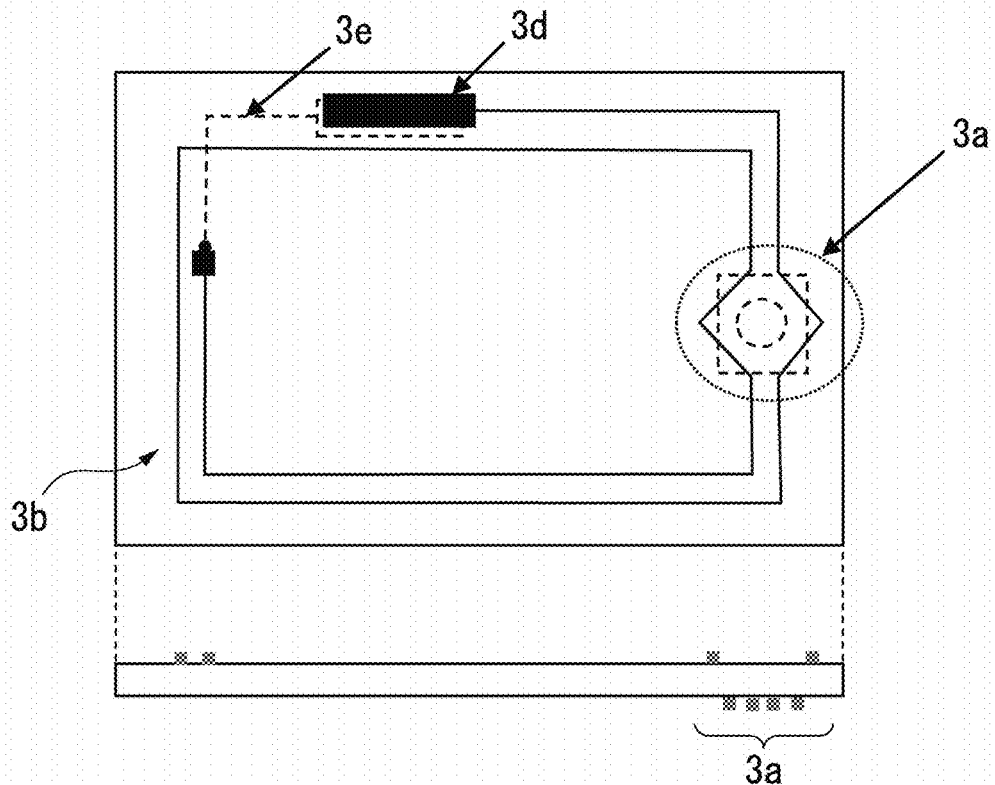
FIG. 5C is a schematic view showing an example of an antenna according to the first embodiment of the present invention.
Figure 5D:
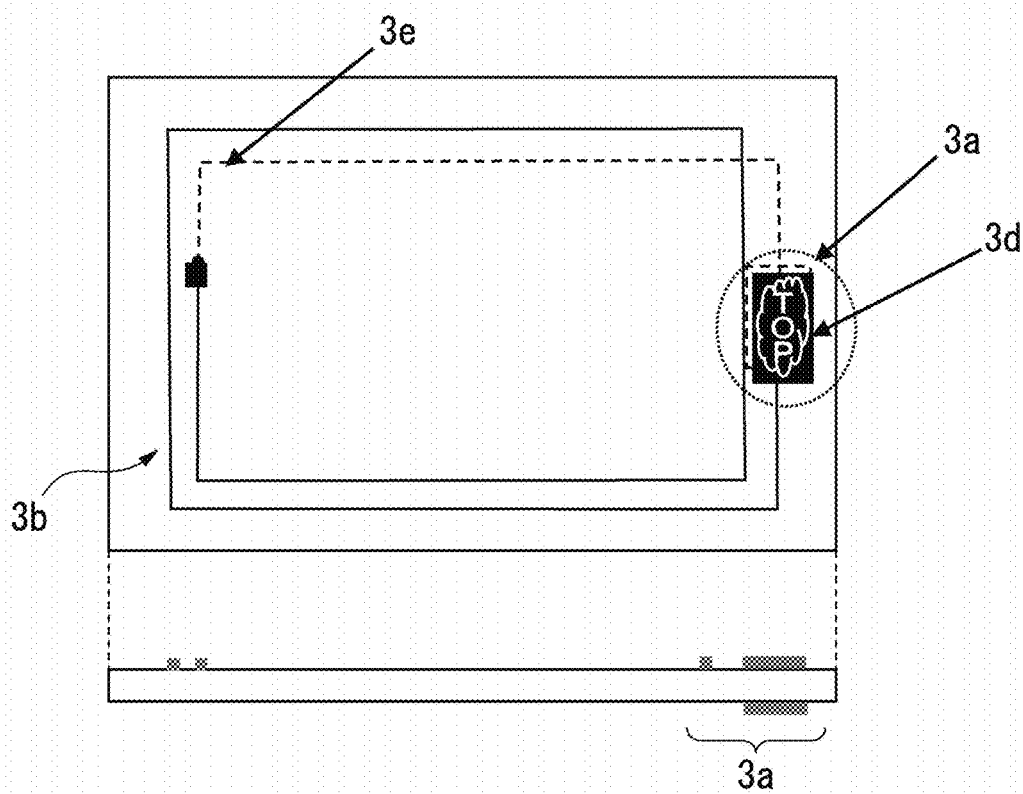
FIG. 5D is a schematic view showing an example of an antenna according to the first embodiment of the present invention.

FIGS. 3 and 4 show cross-sectional views of the examples of FIGS. 1 and 2, respectively.

The layer structure will be described in detail with reference to the examples of FIGS. 2 to 4.

In FIGS. 2 to 4, from the lower layer side, there are provided a second laser marking layer 7, an antenna formation layer (decorative layer) 3 where an antenna is formed therein, which includes a decorative portion 3a composed of a patterned metal thin-film layer and a non-decorative portion 3b, a transmissive energy resistant layer 5 provided on the antenna formation layer 3, a colored layer 4 provided on the transmissive energy resistant layer 5, a laser marking layer 2 provided on the colored layer 4, and a light transmissive hologram layer 6 provided on the uppermost layer.

The colored layer 4 has a colored portion 4b and a window portion 4a, and the window portion 4a is formed as a non-colored portion that is not colored so that the decorative portion 3a formed on the antenna formation layer 3 is exposed. The laser marking layer 2 has a personal information marking portion 2a composed of a face image printed by a laser so as to overlap the decorative portion 3a via the window portion 4a. Furthermore, the laser marking layer is also provided with a personal information marking portion 2b in which a name, a number, and the like are printed.

In the example of FIG. 3, the light transmissive hologram layer 6 is formed so as to cover the entire surface of the personal identification medium; however, in the example of FIG. 4, the light transmissive hologram layer 6 is formed so as to partially cover a personal information marking portion composed of a face image.

The antenna formation layer 3 is formed of a patterned metal thin-film layer, and is a layer for forming an antenna having a decorative portion 3a and a non-decorative portion 3b.

Examples of the material used for the antenna formation layer 3 include a polycarbonate-based base material, a polyester-based base material, an acrylic-based base material, and a vinyl chloride-based base material. In particular, polyethylene terephthalate can be preferably used. The thickness of the antenna cambium is approximately 10 to 300 µm.

The decorative portion 3a of the antenna is composed of a patterned metal thin-film layer formed on the antenna formation layer 3, and at least a portion of the decorative portion 3a of the antenna is connected to the non-decorative portion 3b.

Examples of the material of the metal thin-film layer include aluminum and copper.

The antenna having the decorative portion 3a and non-decorative portion 3b can be formed by patterning a metal thin-film layer formed on one surface or both surfaces of the antenna formation layer 3 by etching. It may be formed by removing the metal thin-film layer in a pattern with a laser or the like.

The material used for the metal thin-film layer is not particularly limited, and examples thereof include Al and Cu.

The decorative portion 3a preferably includes a fine line art pattern composed of a positive pattern or a negative pattern of the metal thin-film layer.

The line width of the line art pattern is preferably 0.1 to 3 mm.

In the present invention, since the antenna is broken even if the decorative portion is duplicated, it is possible to detect that fraud has been performed by non-contact communication inspection; however, even if an attempt is made to cheat only by appearance, this range If this is the case, it is preferable because it can make it difficult to illegally reproduce the decorative portion.

Examples of line art patterns include patterns such as colored patterns, fine patterns, colored patterns, letters, numbers, and symbols.

The decorative portion may be combined with other patterns as long as the above-mentioned fine line art pattern is included.

In the above example, since a finer line art pattern can be formed, the decorative portion 3a and the non-decorative portion 3b are made into a patterned metal thin-film layer (so-called etching antenna). However, the decorative portion 3a and the non-decorative portion 3b may be metal windings formed so as to apply heat to bond the metal wire to the antenna formation layer.

The antenna is typically formed in a coil shape; however, may be an antenna such as a dipole antenna.

The non-decorative portion 3b occupies most of the antenna that contributes to communication. The non-decorative portion 3b is formed by a linear pattern, and the line width is approximately 10 to 50 µm.

The non-decorative portion 3b is connected to an IC chip or an IC module separately provided on the antenna formation layer. Non-contact communication is possible by providing an antenna and an IC chip.

The antenna may be provided with a condenser for adjusting the capacitance component. For example, as shown in FIGS. 5A to 5D, one condenser may be provided; however, a plurality of condensers may be provided so that the capacitance component can be finely adjusted.

In addition, in the case of using a coiled antenna and having a plurality of turns, it is necessary to provide a portion that straddles the wire. In that case, a jumper member may be attached, or a jumper wire may be provided on the surface opposite to the surface on which the antenna coil is formed as shown in 3e of FIGS. 5A to 5D.

The decorative portion 3a is formed in a portion of the antenna, and at least a portion thereof is formed so as to be connected to the non-decorative portion 3b.

The decorative portion 3a may be provided on either one surface of the antenna formation layer 3 or may be provided on both surfaces. Providing the decorative portion 3a on both sides is preferable because illegal duplication becomes difficult. When the decorative portion 3a is provided on both surfaces, it is preferable to change the pattern of the decorative portion provided on one surface and the decorative portion provided on the other surface. In addition, when provided on both surfaces, the decorative portion 3a on one of the surfaces is formed so as to be connected to the antenna; however, the decorative portion provided on the other surface may or may not be connected to the antenna. By doing so, the structure of the decorative portion becomes more complicated, and unauthorized duplication is made difficult.

When the decorative portion 3a is provided on both surfaces, the first pattern is arranged on the surface of the antenna layer 3, and the second pattern overlaps at least a portion of the first pattern on the surface opposite to the surface. By providing the two patterns, a moiré pattern can be produced by the optical effect. Even if there is an unauthorized modification at the decorative portion, it is difficult to restore the moiré pattern once it has been modified, so the anti-counterfeiting effect can be enhanced.

For example, the decorative portion 3a may be formed by an antenna coil formed on one surface of the antenna formation layer 3. In particular, as shown in the top view and the side view of FIG. 5A, in the decorative portion 3a, two parallel antenna coils can be formed in a symmetrical butterfly shape. Then, a capacitor 3d is provided in the non-decorative portion 3b which is a main portion of the antenna coil, and the capacitor 3d can be connected to the IC chip via the jumper wire 3e on the back surface, straddling the antenna coil, and via the connecting portion.

Further, the decorative portion 3a may be formed by a pattern independent of the antenna coil formed on one surface of the antenna formation layer 3. In particular, as shown in the top view and the side view of FIG. 5B, two parallel winding antenna coils are formed into a curve on an arc that is symmetrical, and a double ellipse is formed between the antenna coils. An arc having a shape similar to the shape of the antenna coil can be formed on the outside of the antenna coil. Then, a capacitor 3d is provided in the main non-decorative portion 3b of the antenna coil, and the capacitor 3d can be connected to the IC chip via the jumper wire 3e on the back surface, straddling the antenna coil, and via the connecting portion.

Further, an antenna coil is formed on one surface of the antenna formation layer 3, a portion of the linear pattern forming the decorative portion 3a is connected to the non-decorative portion, and an independent linear pattern is formed on the other surface. It can be a shape having a pattern. In particular, in the example of the top view and the side view of FIG. 5C, in the decorative portion 3a, the two parallel winding antenna coils are bent in a dogleg shape so as to be symmetrical so as to form a substantially rhombus. A quadrangle can be formed on the other surface of the cambium 3 so as to overlap the rhombus shape, and a circular pattern (see the dotted line in the top view of FIG. 5C) can be formed inside the quadrangular pattern. Then, a capacitor 3d is provided in the main non-decorative portion 3b of the antenna coil, and the capacitor 3d can be connected to the IC chip via the jumper wire 3e on the back surface, straddling the antenna coil, and via the connecting portion.

Furthermore, the decorative portion 3a may be formed on the condensers provided on the front and back surfaces of the antenna formation layer 3. In particular, as shown in the top view and the side view of FIG. 5D, a condenser made of a metal thin-film layer having a certain area is provided on the front and back surfaces of the antenna cambium, and characters, fine patterns, and the like can be provided on the front and back condensers in a negative pattern. Then, from the back surface of the capacitor 3d, the antenna coil can be straddled via the jumper wire 3e and connected to the IC chip via the connecting portion.

The front and back patterns form the same characters and patterns, and the positions can be aligned. Further, different patterns may be provided on the front and back sides to form a complicated pattern with overlapping portions and non-overlapping portions of the punched patterns.

Further, the jumper wire 3e may be used as a portion of the decorative portion.

Further, the decorative portion 3a can be provided with fine irregularities to give an optical effect. In particular, a fine concave and convex structure for exhibiting an optical effect can be formed in advance on the antenna formation layer 3, and a decorative portion made of a patterned metal thin-film layer can be formed on the fine concave and convex structure. In addition, it is possible to form a fine concave and convex structure that exerts an optical effect by embossing or the like after forming a decorative portion made of a patterned metal thin-film layer on the antenna formation layer 3.

When the decorative portion 3a and the non-decorative portion 3b are formed of a metal thin-film layer such as aluminum, a plurality of convex or concave linear streaks are formed on the aluminum surface when the metal thin film is rolled. Since these linear streaks have directivity and affect the scattering of light, they contribute to visually confirming the traces from the scattered state of light when forgery and falsification is performed. Therefore, the linear streaks are preferably in the range of, for example, a width of 1 to 100 μm, a pitch of 1 to 100 μm, a depth or a height of 0.01 to 0.5 μm.

The laser marking layer 2 is a layer in which personal information (ID information) and the like are marked by a laser.

The material used for the laser marking layer 2 is not particularly limited as long as it can be marked by a laser and has light transmissive property for making the decorative portion of the lower layer visible; however, for example, it is carbonized by irradiating with laser light. Materials that develop a black color, materials that develop a color by changing the chemical structure by irradiating a laser beam and changing the absorption and reflection state of light, and materials that develop a color by irradiating a laser beam change the state of the surface and interface (cutting and foaming), a material that can be marked can be used.

From the viewpoint of productivity and quality, it is preferable to use a material that absorbs laser light and develops color (carbonized black) by the generated heat. As such a material, a known material can be applied; however, a resin material having absorption characteristics at the wavelength of the laser used can be used.

As the laser used for color development, various lasers such as an ultraviolet region, a visible region, and an infrared region can be used. A laser in the infrared region has a relatively low energy, and a material that absorbs only the infrared region does not affect the light transmissive property in the visible light region, so that it can be preferably used.

When an infrared laser is used, as the material used for the laser marking layer 2, a material that absorbs light of the laser wavelength used (infrared wavelength: approximately 700 to 1300 nm) and transmits visible light can be used. For example, a polycarbonate-based material having absorption characteristics in the infrared region (wavelength of approximately 700 to 1300 nm) can be mentioned.

The visible light transmittance of the laser marking layer 2 may be 80% or more within the wavelength range of 420 to 780 nm.

The laser marking layer is formed by marking the user's personal information marking portion 2a and 2b with a laser. Examples of personal information (ID information) to be marked include facial photo information, name, date of birth, ID number, and the like.

Further, at least one personal information marking portion 2a is formed so as to overlap with the decorative portion 3a formed in the lower layer.

In personal identification using a personal identification medium, in many cases, the user is asked to present the personal identification medium and a visual judgment is made. When making a visual judgment, the ID number, date of birth, and the like cannot be determined without having the information in advance, so the judgment is made by comparing the face photo information with the person himself/herself. Therefore, the face photo information is often forged, and it is required to prevent the forgery and alteration of the face photo information. Therefore, it is preferable that the personal information marking portion 2a, which can suppress counterfeit modification by being formed so as to overlap the decorative portion 3a, is facial photograph information.

The personal information marking portion 2a formed so as to overlap with the decorative portion 3a does not have individual lines or dots constituting personal information; however, has one meaning as a whole such as a face photograph, a series of IDs, and a name.

Further, the personal information marking portion 2b can be formed at a position that does not overlap with the decorative portion 3a. The personal information marking portion 2b can be provided with character information such as name, date of birth, and number information.

In addition, information other than personal information can be marked on the laser marking layer.

Figure 8:
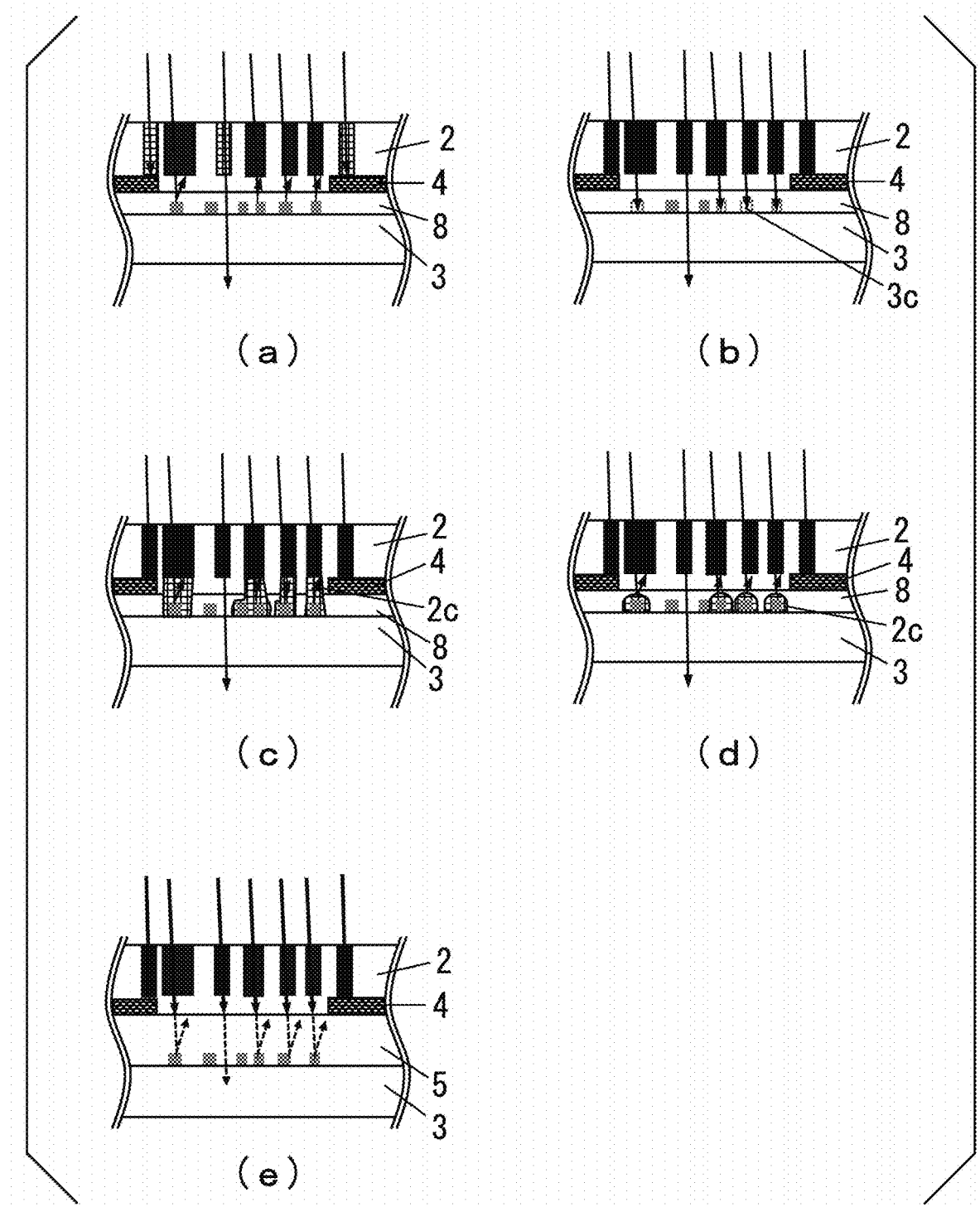
FIG. 8 is a schematic view showing an example of a laser marking process of the personal identification medium of the present invention.

As shown in FIG. 8, marking of personal information (ID information) is performed by irradiating a laser from the upper portion of the personal identification medium.

As described above, various lasers in the ultraviolet region, the visible region, the infrared region, and the like can be used as the laser to be used; however, the laser in the infrared region can be preferably used. Examples of the laser in the infrared region include a CO2 laser and a YAG laser having a wavelength of approximately 700 to 1300 nm.

Further, the colored layer 4 can be provided between the laser marking layer 2 and the antenna formation layer 3.

The colored layer 4 can be used as a layer for forming the design of the face of the ticket. Further, the antenna portion of the lower antenna formation layer 3 can be concealed.

The colored layer 4 includes a colored portion 4b and a window portion 4a.

As the coloring layer 4, a printing layer such as a pattern printed on one surface or both surfaces of a transparent or white resin base material, or the coloring film itself can be used. When the colored layer 4 is obtained by printing on a transparent resin base material, a light transmissive energy resistant layer described later can be used as the transparent resin base material.

When printing is performed on a transparent or white resin base material as the colored layer 4, a patterned pattern may be printed on the resin base material, or the entire surface may be printed as solid.

When a transparent resin base material is used, a patterned pattern may be printed on a base printing layer such as white. When it is desired to conceal the lower antenna, it is preferable to print the pattern on the solid print layer or the base print layer.

As the transparent or white resin base material, a polycarbonate-based base material, a polyethylene terephthalate or polyester-based base material, a vinyl chloride-based base material, a polyolefin-based base material, or the like can be used.

In the colored layer 4, the area overlapping the decorative portion 3a has a window portion 4a for making the decorative portion 3a visible. By using the window portion 4a, the decorative portion 3a formed on the antenna formation layer and the personal information marking portion 2a formed on the laser marking layer overlap with each other via the window portion 4a in the thickness direction of the layer, and thus pass through the window portion 4a. Therefore, it can be displayed so as to overlap at least a portion of the personal information marking portion 2a and the decorative portion 3a so that they can be visually recognized. Therefore, it can be difficult to modify from the back surface.

When a transparent resin base material is used as the base material of the coloring layer 4, a non-printing portion is provided among the coloring portions 4b (printing layer) provided on the transparent resin base material, and this non-printing portion is referred to as a window portion 4a. When a colored base material or film is used as the colored layer 4, an opening can be provided in the colored base material or film to be used as a window portion 4a and a non-opening portion can be used as a colored portion 4b. In this case, a fitting member made of a transparent material can be fitted into the opening. By doing so, it is possible to form a structure without steps while maintaining the light transmissive property of the window portion.

The member to be fitted into the opening (window portion) may be colored in a range in which the lower decorative portion 3a can be visually recognized. In particular, a colored transparent film can be used. By doing so, it is possible to easily identify the counterfeit product from the color of the colored transparent film when being tampered with illegally.

The window portion 4a is typically colorless and transparent or preferably colored and transparent.

Figure 6:
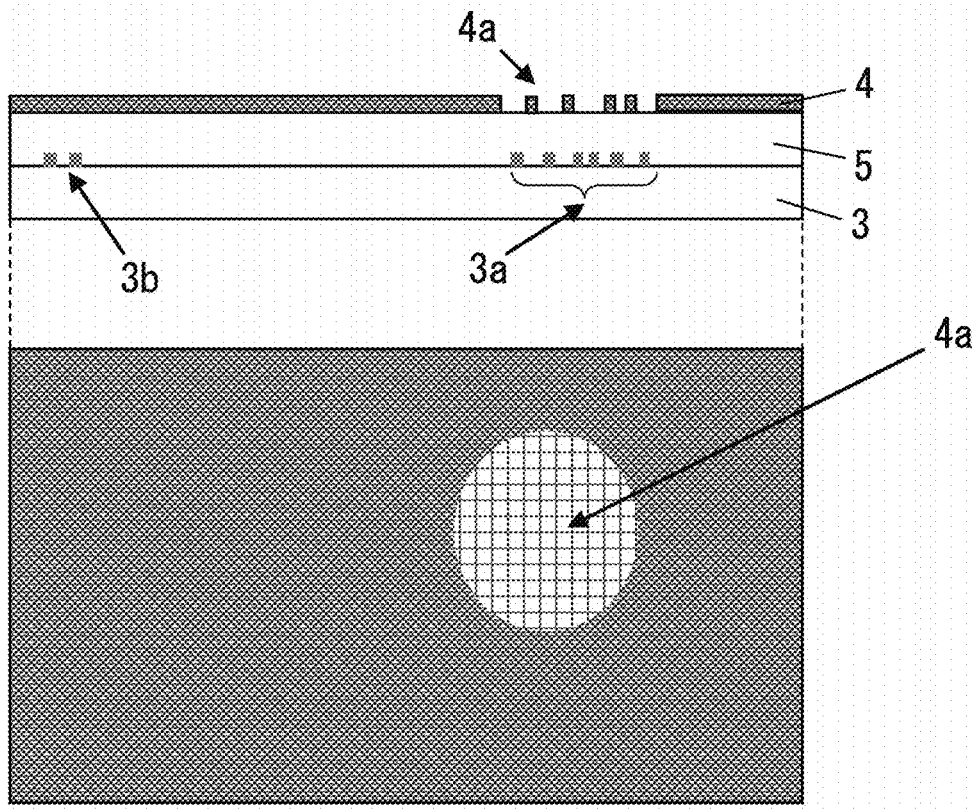
FIG. 6 is a schematic view showing an example of a colored layer of the personal identification medium of the present invention.

Further, the window portion 4a does not have to be colorless and transparent or colored transparent, as long as the decorative portion 3a can be made visible, and for example, as shown in FIG. 6, a pattern composed of a pattern such as a colored pattern may be provided.

By providing a pattern or the like consisting of a pattern on the window portion 4a, the personal information marking portion 2a, the pattern consisting of the pattern of the window portion 4a, and the decorative portion 3a are displayed in an overlapping manner, resulting in a more complicated configuration and difficulty in forgery. It is preferable that the pattern formed on the window portion 4a is a material that does not absorb the laser light used for marking the laser marking layer. This is because if the material absorbs the laser light, the pattern consisting of the pattern will be discolored or disappear due to the laser light passing through the laser marking layer. When an infrared laser is used for marking the laser marking layer, it is preferable that the pattern consisting of the pattern of the window portion 4a is formed by an ink that transmits an infrared wavelength.

Further, the personal information marking portion 2a provided on the laser marking layer 2 may be formed so as to partially overlap the colored portion 4b of the colored layer 4.

Figure 7:
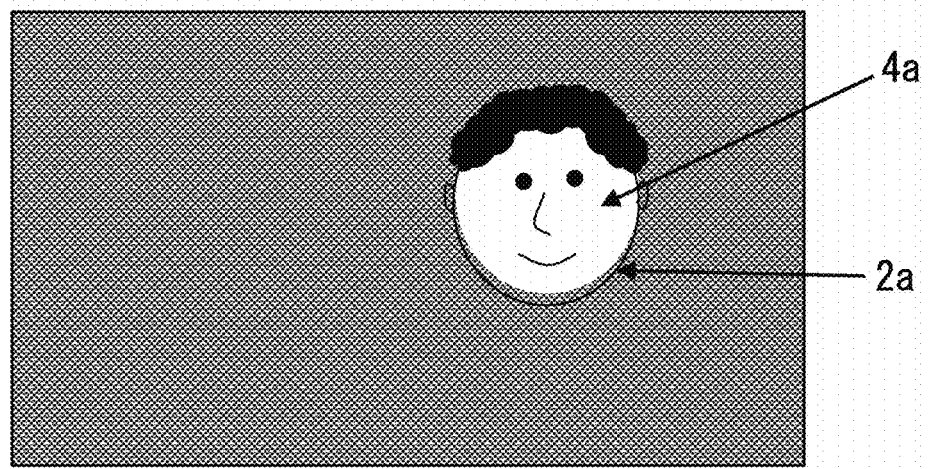
FIG. 7 is a schematic view showing an example of a colored layer of the personal identification medium of the present invention.

In particular, as shown in FIG. 7, most of the personal information marking portion 2a is printed so as to be located on the window portion 4a, and a portion of the personal information marking portion 2a protrudes from the window portion 4a. Printing can be performed so as to overlap the colored portion 4b of the colored layer 4.

By doing so, as a modification from the back side, even if the personal information marking portion 2a is scraped to fit the illegal personal information marking portion 2a and the decorative portion 3a is forged and fitted, the illegal individual. It can be determined that the forgery was made from the discontinuity (uncomfortable feeling) between the information marking portion 2a and the personal information marking portion 2a remaining on the colored portion 4b of the colored layer 4.

The portion of the personal information marking portion 2a that protrudes from the window portion 4a and overlaps the colored portion 4b of the colored layer 4 is preferably approximately 5% to 30% of the personal information marking portion.

Further, a light transmissive energy resistant layer 5 can be provided between the colored layer 4 and the decorative portion 3a.

As described above, the personal information marking portion 2a is marked by irradiating the laser from the upper portion of the personal identification medium.

When a patterned metal thin-film layer is present under the laser marking layer, the color development density of the laser marking layer and the underlying metal thin-film layer may be adversely affected when the laser is irradiated.

For example, when the decorative-layer formation layer 3 is located immediately below the laser marking layer 2 while sandwiching the thin adhesive layer 8, the following problems may occur.

For example, as shown in FIG. 8A, the laser that could not be completely absorbed by the laser marking layer 2 may be transmitted, reflected by the decorative portion 3a, and then incident on the laser marking layer 2 again, resulting in color development by the re-incident laser. In particular, since the decorative portion 3a is formed in a pattern, color development of the laser marking layer 2 due to laser re-incident as described above may occur at a position where the metal thin-film layer is presented. However, in the position where the metal thin-film layer does not exist, the laser is transmitted to the lower layer, and the color development of the laser marking layer 2 due to the laser maximum incident does not occur. Therefore, a density difference may occur between the position where the metal thin-film layer of the decorative portion 3a exists and the position where the metal thin-film layer does not exist in the laser marking layer.

Further, depending on the output conditions of the laser, as shown in FIG. 8B with the same configuration, the laser that could not be absorbed by the laser marking layer 2 is transmitted, and the metal thin-film layer of the decorative portion 3a may be removed (see the removing portion 3c).

In addition, as shown in FIG. 8C, the heat generated in the laser marking layer is transferred to the lower layer and is transmitted through the decorative portion 3a having high thermal conductivity to develop the surrounding color, which may cause an unintended coloring portion 2c.

Furthermore, as shown in FIG. 8D, the laser that could not be completely absorbed by the laser marking layer 2 is transmitted and is absorbed by the decorative portion 3a to generate heat, and the periphery of the decorative portion 3a is colored, so that the unintended coloring portion 2c may be generated.

Therefore, in the present invention, as shown in FIG. 8E, by providing the light transmissive energy resistant layer 5 between the colored layer 4 and the decorative-layer formation layer 3, the energy generated by the laser beam is before reaching the decorative portion 3a. Since it is attenuated and disappeared or attenuated by the time it reaches the laser marking layer 2 reflected at the position where the metal thin-film layer of the decorative portion 3a is presented, it is possible to prevent the above-mentioned density spots and unintended color development.

As the light transmissive energy resistant layer 5, a layer which attenuates and eliminates the light energy that has passed through the laser marking layer 2, prevents the propagation of heat generated in the laser marking layer, or attenuates and eliminates the light energy as well as prevents the propagation of heat generated in the laser marking layer is used. When the light energy is attenuated and eliminated, it can be formed by using a material that absorbs and scatters the wavelength of the laser using the light transmissive energy resistant layer 5. When using a laser in the infrared region, an infrared absorption and scattering layer can be used. A heat resistant layer can be used to prevent heat propagation generated in the laser marking layer.

The light transmissive energy resistant layer is transparent in the visible light region, and may have transparency in visible light so that the decorative portion 3a can be seen when visually recognized from an upper portion. The transmittance of visible light may be 80% or more within the wavelength range of 420 to 780 nm.

The light transmissive energy resistant layer is typically colorless and transparent; however, the decorative portion 3a of the lower layer may be colored within a visible range. In particular, a colored transparent film can be used. By doing so, it is possible to easily identify the counterfeit product from the color of the colored transparent film when there is an unauthorized falsification.

As the light transmissive energy resistant layer, both or either one of a resin material using a material that absorbs or reflects the wavelength of the used laser and a heat-resistant material can be used.

Even if the absorption rate and heat resistance of the laser beam to be used are low, it is sufficient that the thickness is set to a certain level so that the above-mentioned problems do not occur.

In particular, a polycarbonate resin material or a polyester resin material such as polyethylene terephthalate (PET) can be used.

As the thickness, a thickness of approximately 25 to 500 μm can be employed.

As described above, when the colored layer 4 is formed on the transparent resin base material, the light transmissive energy resistant layer 5 can be used as the transparent resin base material of the colored layer 4.

The light transmissive energy resistant 5 may also serve as the decorative-layer formation layer 3.

Figure 9:
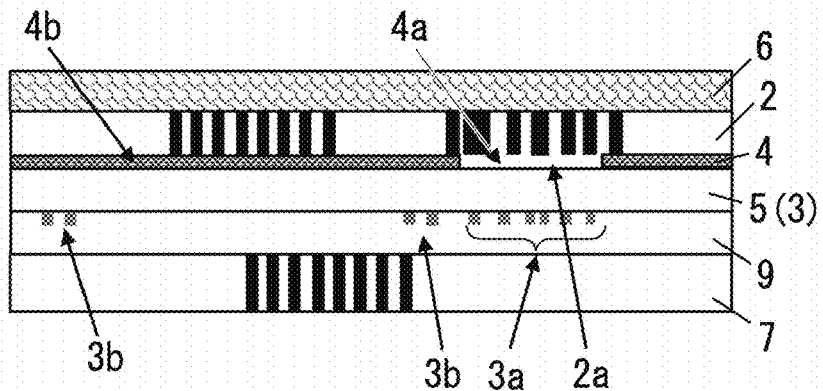
FIG. 9 is a cross-sectional view showing an example of a personal identification medium according to the first embodiment of the present invention.

In particular, as shown in FIG. 9, the layer structure of FIG. 3 may have a configuration such that the decorative-layer formation layer 3 is formed of the same material layer as the material used for the light transmissive energy resistant layer 5, and the decorative portion 3a is provided on the lower layer side. At this time, the antenna 3b may be formed on the upper surface, the lower surface, or both of the light transmissive energy resistant layer 5 and the decorative-layer formation layer 3.

A light transmissive security function layer 6 can be provided on the laser marking layer 2 provided with the personal information marking portion 2a.

By providing the light transmissive security function layer 6, it is possible to prevent unauthorized modification of the personal information marking portion 2a from an upper portion, and it is possible to enhance the anti-counterfeiting effect.

The light transmissive security function layer 6 is formed so as to cover at least the personal information marking portion 2a.

For example, as shown in FIG. 3, it may be formed so as to cover the entire surface of the laser marking layer 2, or as shown in FIG. 4, it may be formed so as to cover only the vicinity of the personal information marking portion 2a formed on the laser marking layer 2.

The light transmissive security function layer 6 can typically use a light transmissive hologram. The light transmissive hologram is formed of a light transmissive hologram formation layer made of a light transmissive resin and a light transmissive reflective layer.

A relief type hologram or a deposition phase type hologram can be used as the light transmissive hologram formation layer. A resin composition such as an acrylic resin can be used as the material for forming the light transmissive hologram.

As the light transmissive reflective layer, a metal compound such as zinc oxide, titanium oxide or zinc sulfide can be used.

The light transmissive hologram layer is provided with an adhesive layer and is attached onto the laser marking layer as a transfer foil or a seal. Although not shown, the transfer foil can be transferred so that the peel protection layer is arranged on the uppermost layer after the transfer, and the seal base material is attached so as to be arranged on the uppermost layer in the case of a seal. When the light transmissive hologram layer 6 is partially provided as shown in FIG. 4, a sealing base material can be formed so as to cover the entire peeling protective layer and the laser marking layer 2 described above, and can be used as the protective layer.

In addition, the light transmissive hologram layer may be laminated by using a sheet in which the light transmissive hologram is directly formed on the resin base material (sheet).

When the light transmissive security function layer 6 is provided, when marking the personal information marking portion 2a on the laser marking layer 2, a portion of the light transmissive hologram having a hologram structure and a portion having a different structure are used. As a result, the density of the personal information marking portion 2a provided on the laser marking layer 2 may partially change because the state of transmission, reflection, diffusion, and the like of the laser light changes.

However, when the personal information marking portion 2a of the laser marking layer 2 is visually recognized, it is visually recognized through the light transmissive security function layer 6, so that the structure of the light transmissive security function layer 6 is affected. Therefore, the difference in density of the personal information marking portion 2a of the laser marking layer 2 described above is not a concern.

In addition, a light transmissive security function layer can be provided on the back surface. In this case, the laser marking layer 2 can be provided so as to overlap the personal information marking portion 2a and the decorative portion 3a, and by doing so, the security against modification from the lower layer is improved.

As the light transmissive security function layer provided on the back surface, the light transmissive hologram described in the light transmissive security function layer 6 can be typically used.

In the present invention, the second laser marking layer 7 can be provided on the back surface of the personal identification medium. By providing the second laser marking layer 7, personal information and the like can be printed on the back surface as well.

A protective layer may be provided on the outermost layers of the front surface and the back surface.

The personal identification medium 1 of the present invention may be provided with a protective layer on the outermost surface (i.e., both or either one of the uppermost layer and the lowermost layer).

Furthermore, in the present invention, in addition to the above-described descriptions, a function layer or a printing layer may be provided between layers or layers (details will be described later).

In the personal identification medium 1 of the present invention, after laminating each layer, the personal information marking portions 2a (and 2b) are printed on the laser marking layer 2 by a laser. When the second laser marking layer 7 is provided, printing is also performed on the second laser marking layer 7.

The personal identification medium 1 of the present invention can be used as an identification card such as an ID card or a passport.

Figure 10:
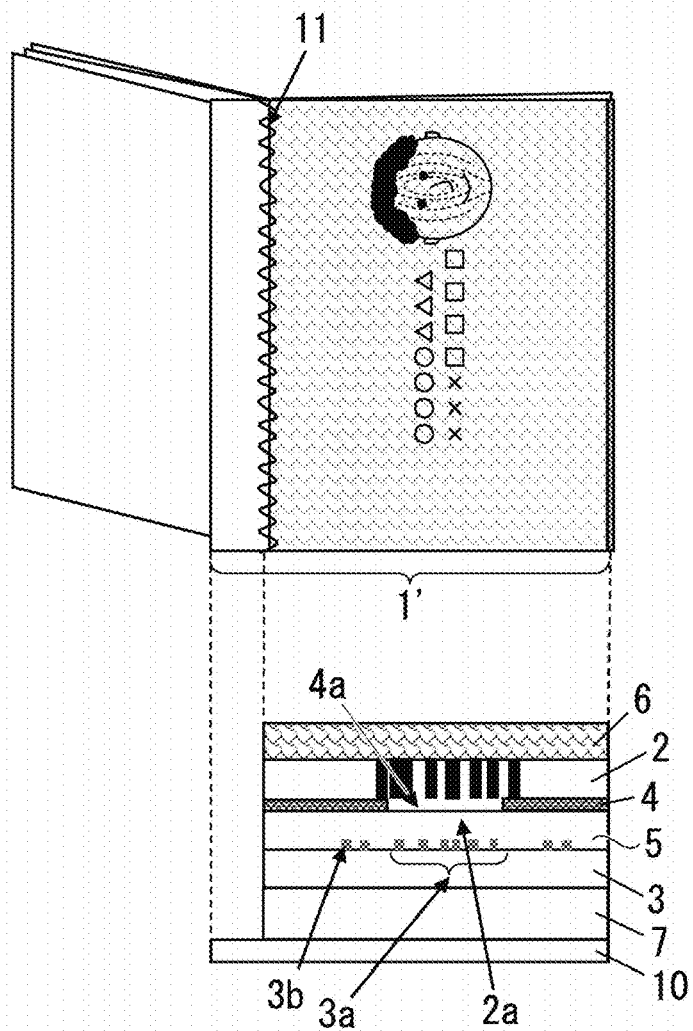
FIG. 10 is a schematic view showing an example of the personal identification medium of the present invention.

When used as a booklet such as a passport, it can be incorporated into a data page (identification page). In particular, as shown in FIG. 10, a hinge layer (for example, paper) 10 having a size greater than that of the personal identification medium 1 is arranged on the layer of the personal identification medium 1, integrated with the personal identification medium 1, and inserted. The personal identification medium 1 can be attached to the booklet by binding the booklet with threads at a portion protruding from the personal identification medium of the layer 10 to form the thread binding portion 11.

Figure 11:
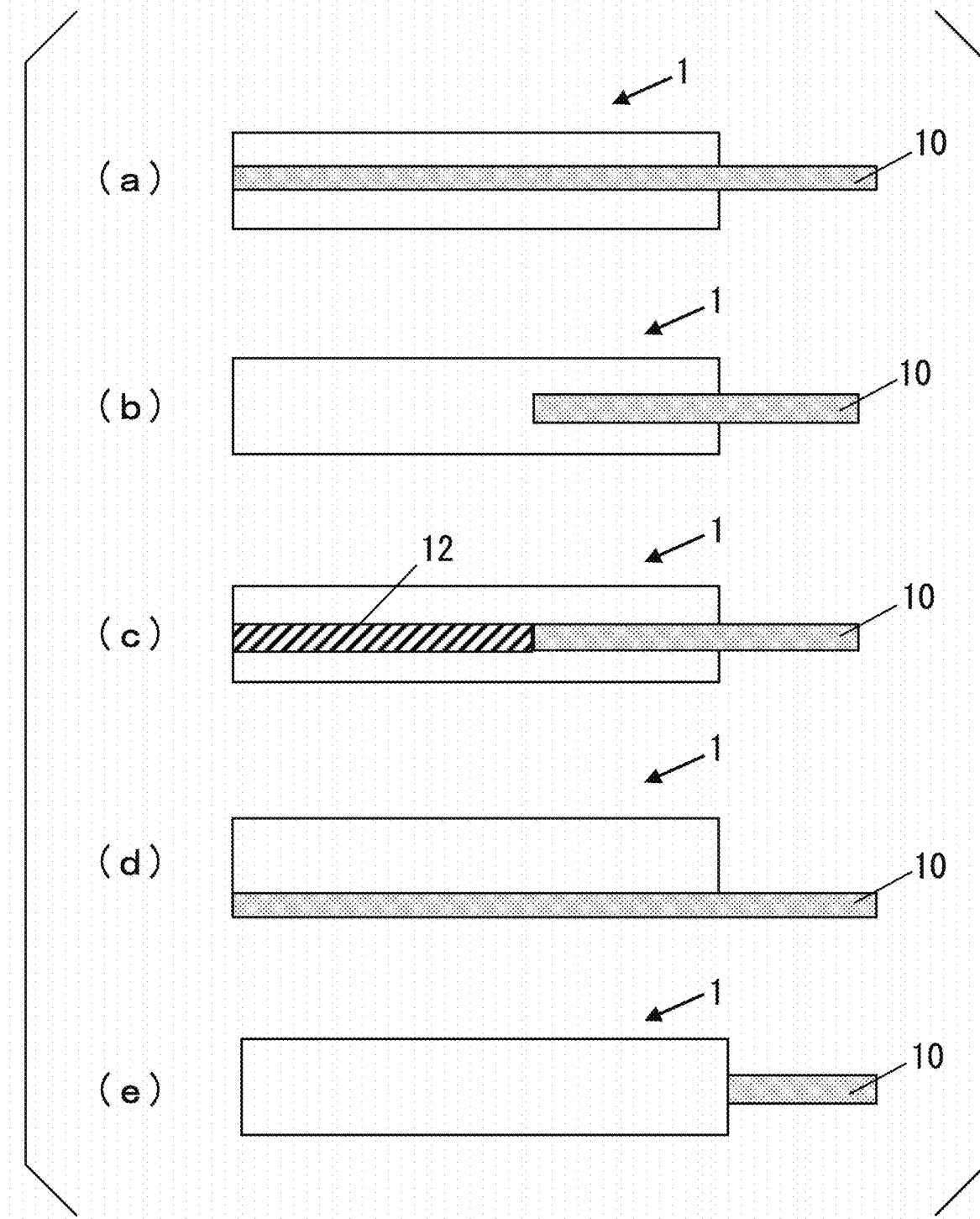
FIG. 11 is a schematic view showing an example of a hinge layer of the present invention.

The arrangement of the hinge layer 10 is not limited to the above, and as long as the characteristics of the personal identification medium 1 are not impaired, the hinge layer 10 may be arranged between the layers of the personal identification medium 1 as shown in part (a) of FIG. 11, and a portion of the hinge layer 10 may be arranged between the layers of the personal identification medium 1 as shown in part (b) of FIG. 11. In addition, as shown in part (c) of FIG. 11, a portion of the hinge layer 10 may be formed of the inlet layer 12 or the filling layer 12 and arranged between the layers of the personal identification medium 1. As shown in part (d) of FIG. 11, the hinge layer 10 may be welded to the outside of the personal identification medium 1 by applying ultrasonic waves or heat.

Examples of the material of the hinge layer include a resin such as a polyester resin film, a thermoplastic urethane resin film, and a nylon resin film, or a polyester cloth or a nylon cloth.

The thickness of the hinge layer 10 is preferably 20 to 250 μm in order to suppress an increase in the thickness after integration.

Second Embodiment

Figure 12:
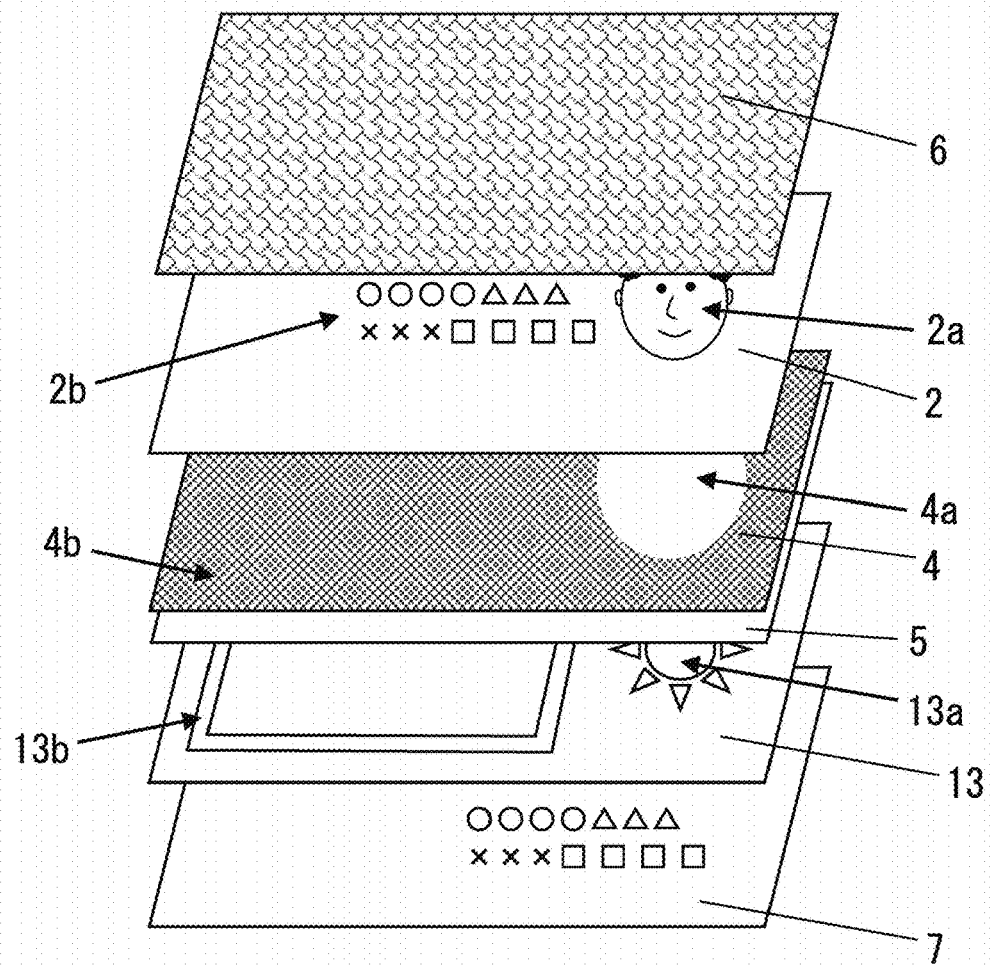
FIG. 12 is a schematic view showing an example of a personal identification medium according to a second embodiment of the present invention.

FIG. 12 shows a schematic diagram showing an outline of the layer structure of the ID card in the second embodiment. As a specific example of the personal identification medium of the present invention, an ID card similar to that in FIG. 1 is used.

In FIG. 12, there are provided printed information as a personal information marking portion such as a face photo information, name, and a number by laser marking, and a decorative portion composed of a patterned metal thin-film layer formed so as to overlap the lower layer of the face photo information.

With such a configuration, even if the personal information marking portion could be deleted from the back surface by cutting and another personal information could be provided, it can be confirmed that the decorative portion was also destroyed and unauthorized modification of the personal information is performed.

Figure 13:
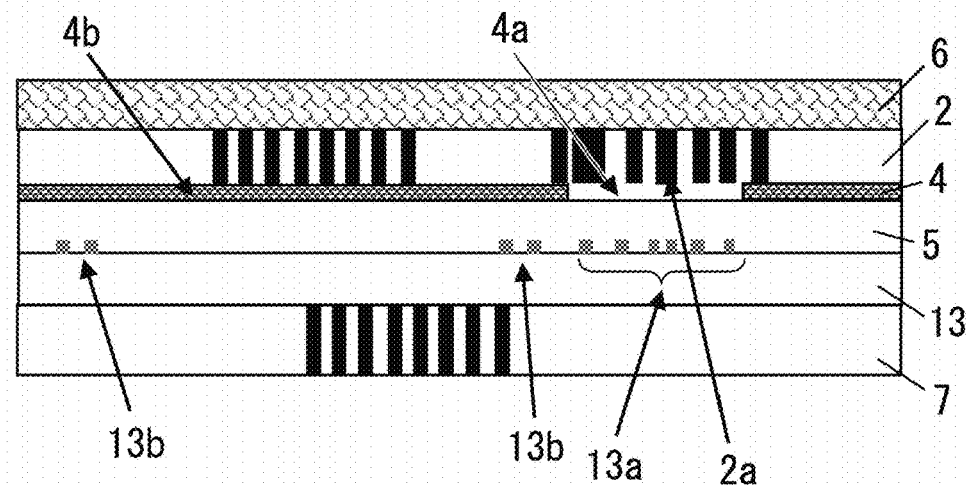
FIG. 13 is a cross-sectional view showing an example of a personal identification medium according to a second embodiment of the present invention.
Figure 14:
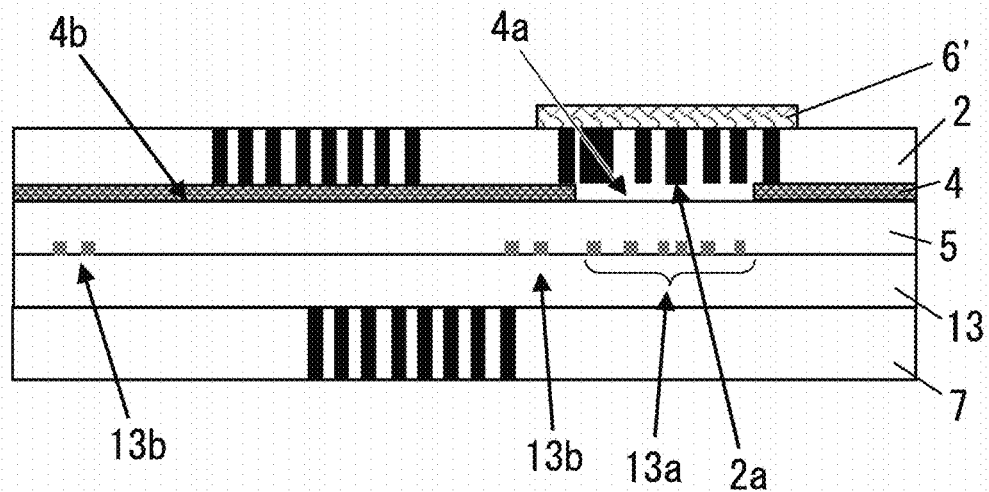
FIG. 14 is a cross-sectional view showing an example of a personal identification medium according to a second embodiment of the present invention.

FIGS. 13 and 14 show cross-sectional views of the example of FIG. 12. Here, details will be omitted for the same configuration as that of the first embodiment.

In FIGS. 12 to 14, from the lower layer side, there are provided a second laser marking layer 7, a decorative-portion formation layer (decorative layer) 13 including a decorative portion 13a composed of a patterned metal thin-film layer and an antenna portion 13b, a transmissive energy resistant layer 5 provided on the decorative-portion formation layer 13, a colored layer 4 provided on the light transmissive energy resistant layer 5, a laser marking layer 2 provided on the colored layer 4, and a light transmissive hologram layer 6 provided on the uppermost layer.

The colored layer 4 has a colored portion 4b and a window portion 4a, and the window portion 4a is formed as a non-colored region so that the decorative portion 13a formed on the decorative-portion formation layer 13 is exposed. The laser marking layer 2 has a personal information marking portion 2a composed of a face image printed by a laser so as to overlap the decorative portion 13a via the window portion 4a. Furthermore, the laser marking layer is also provided with a personal information marking portion 2b in which a name, a number, and the like are printed.

In the example of FIG. 13, the light transmissive hologram layer 6 is formed so as to cover the entire surface of the personal identification medium; however, in the example of FIG. 14, the light transmissive hologram layer 6 is formed so as to partially cover a personal information marking portion composed of a face image.

The decorative-portion formation layer 13 is a layer for forming a decorative portion made of a patterned metal thin-film layer.

Examples of the material used for the decorative-portion formation layer 13 include a polycarbonate-based base material, a polyester-based base material, an acrylic-based base material, and a vinyl chloride-based base material. In particular, polyethylene terephthalate can be preferably used. The thickness of the decorative cambium is approximately 10 to 300 μm.

The decorative portion 13a is composed of a patterned metal thin-film layer formed on the decorative-portion formation layer 13 (so-called etching antenna. It may be a metal winding as described in the first embodiment).

Examples of the material of the metal thin-film layer include aluminum and copper.

The decorative portion 13a preferably includes a fine line art pattern composed of a positive pattern or a negative pattern of the metal thin-film layer.

The line width of the line art pattern is preferably 0.1 to 3 mm.

Within this range, it can be difficult to duplicate even if the decorative portion is scraped off and an attempt is made to duplicate it illegally.

Examples of line art patterns include patterns such as colored patterns, fine patterns, colored patterns, letters, numbers, and symbols.

The decorative portion may be combined with other patterns as long as the above-mentioned fine line art pattern is included.

The decorative portion 13a may be provided on one surface of the decorative-portion formation layer 13 or may be provided on both surfaces.

Providing it on both sides is preferable because it makes it more difficult to duplicate illegally. When it is provided on both surfaces, it is preferable to change the pattern of the decorative portion provided on one surface and the decorative portion provided on the other surface. By doing so, the structure of the decorative portion becomes more complicated, and unauthorized duplication can be made difficult.

The patterned metal thin-film layer can be formed by patterning a metal thin-film layer formed on one surface or both surfaces of the decorative-portion formation layer 13 by etching. It may be formed by removing the metal thin-film layer in a pattern with a laser or the like.

The material used for the metal thin-film layer is not particularly limited, and examples thereof include Al and Cu.

Further, the decorative portion 13a can be provided with fine irregularities to give an optical effect. In particular, a fine concave and convex structure for exhibiting an optical effect can be formed in advance on the decorative-portion formation layer 13, and a decorative portion made of a patterned metal thin-film layer can be formed on the fine uneven structure. Furthermore, after forming a decorative portion made of a patterned metal thin-film layer on the decorative-portion formation layer 13, a fine concave and convex structure that exhibits an optical effect can be formed by embossing or the like.

In addition, in the case of a laminated body having a non-contact communication function, the antenna 13b can be formed at the same time. In this case, the antenna is connected to an IC chip or IC module separately provided on the decorative portion formation layer. Non-contact communication is possible by providing an antenna and an IC chip. The antenna typically shows a coiled antenna; however, it may be an antenna such as a dipole antenna.

The antenna may be provided with a condenser for adjusting the capacitance component. In addition, a plurality of condensers may be provided so that the capacitance component can be finely adjusted.

In the case of using a coiled antenna and having a plurality of turns, it is necessary to provide a portion that straddles the wire. In that case, a jumper member may be attached, or a jumper wire may be provided on the surface opposite to the surface on which the antenna coil is formed.

When the antenna 13b is provided, the decorative portion 13a is provided on the same surface as the antenna 13b; however, when the jumper wire is provided on the surface opposite to the surface on which the antenna coil is formed as described above, the surface on which the antenna 13b is provided is used and can be provided with a decorative portion 13a on the opposite surface.

Figure 15A:
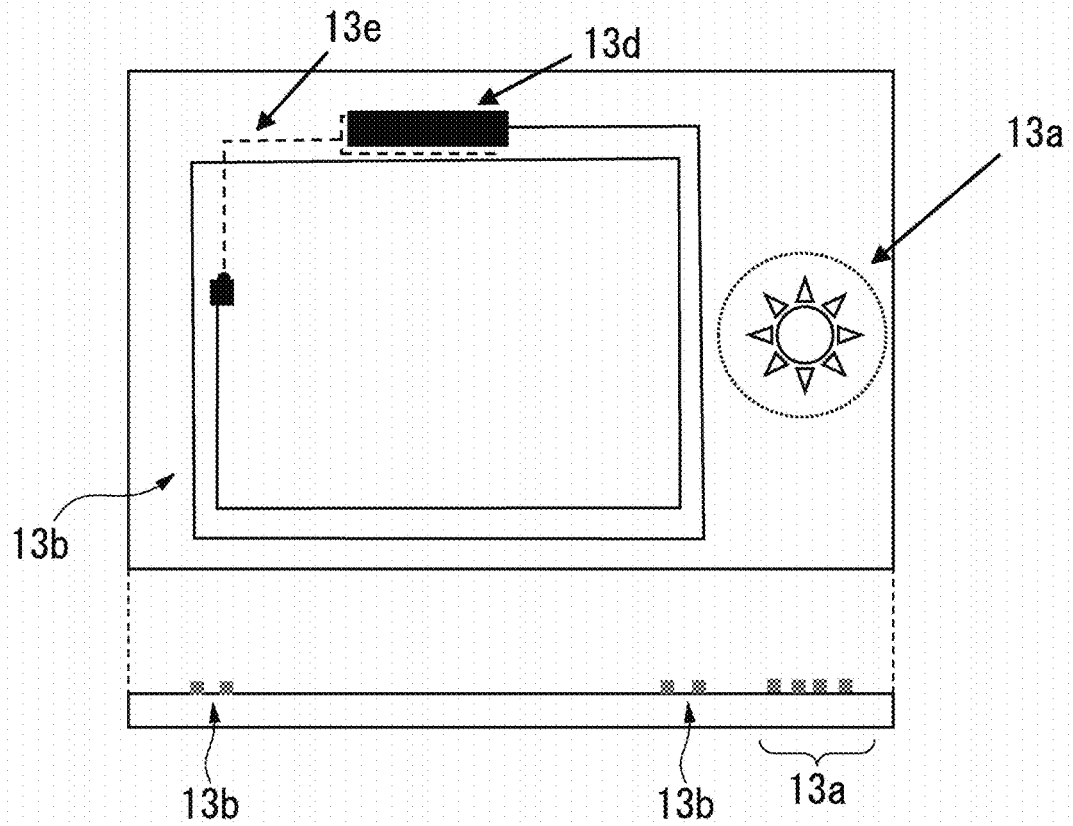
FIG. 15A is a schematic view showing an example of a decorative portion according to the second embodiment of the present invention.

FIG. 15A shows an example of the decorative portion 13a of the present embodiment.

In the top view and side view of FIG. 15A, a decorative portion 13a and an antenna coil 13b formed in a linear positive pattern are formed on one surface of the decorative-portion formation layer. A condenser 13d is provided on the antenna coil 13b, and the condenser 13d is connected to the IC chip via a jumper wire 13e on the back surface, straddling the antenna coil, and via a connecting portion.

Figure 15B:
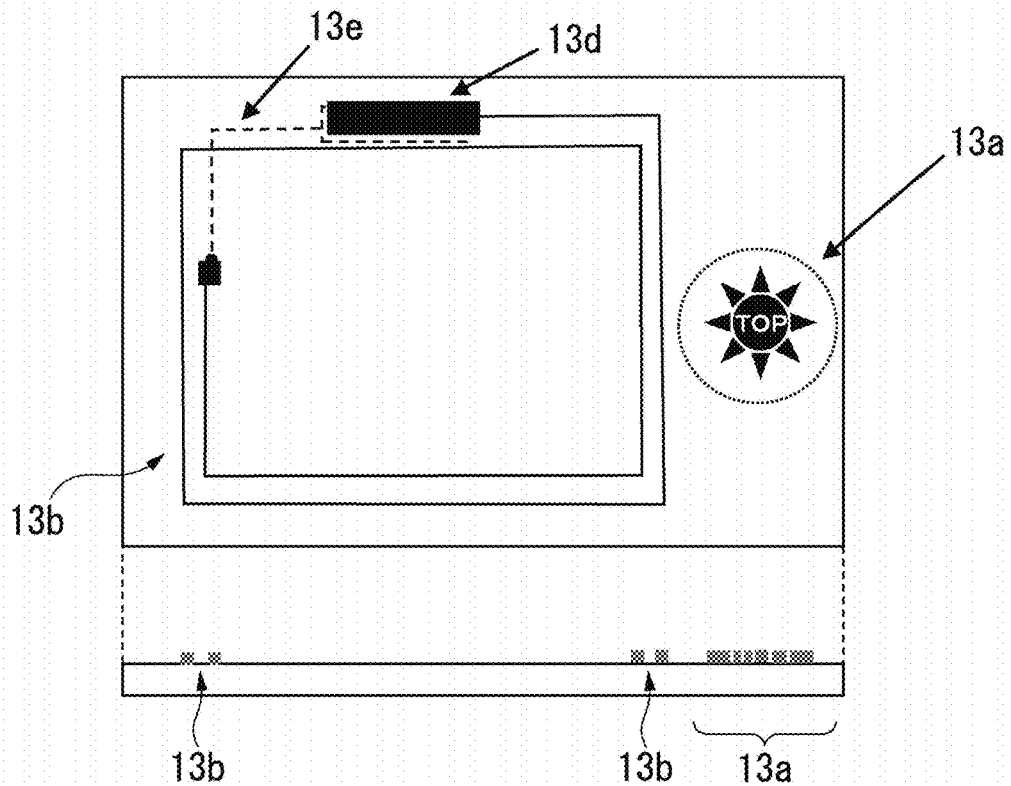
FIG. 15B is a schematic view showing an example of a decorative portion according to the second embodiment of the present invention.

In the example of the top view and the side view of FIG. 15B, the decorative portion 13a and the antenna coil 13b in which characters and fine lines are formed in a linear negative pattern in a planar pattern are formed on one surface of the decorative-portion formation layer. A condenser 13d is provided on the antenna coil 13b, and the condenser 13d is connected to the IC chip via a jumper wire 13e on the back surface, straddling the antenna coil, and via a connecting portion.

Figure 15C:
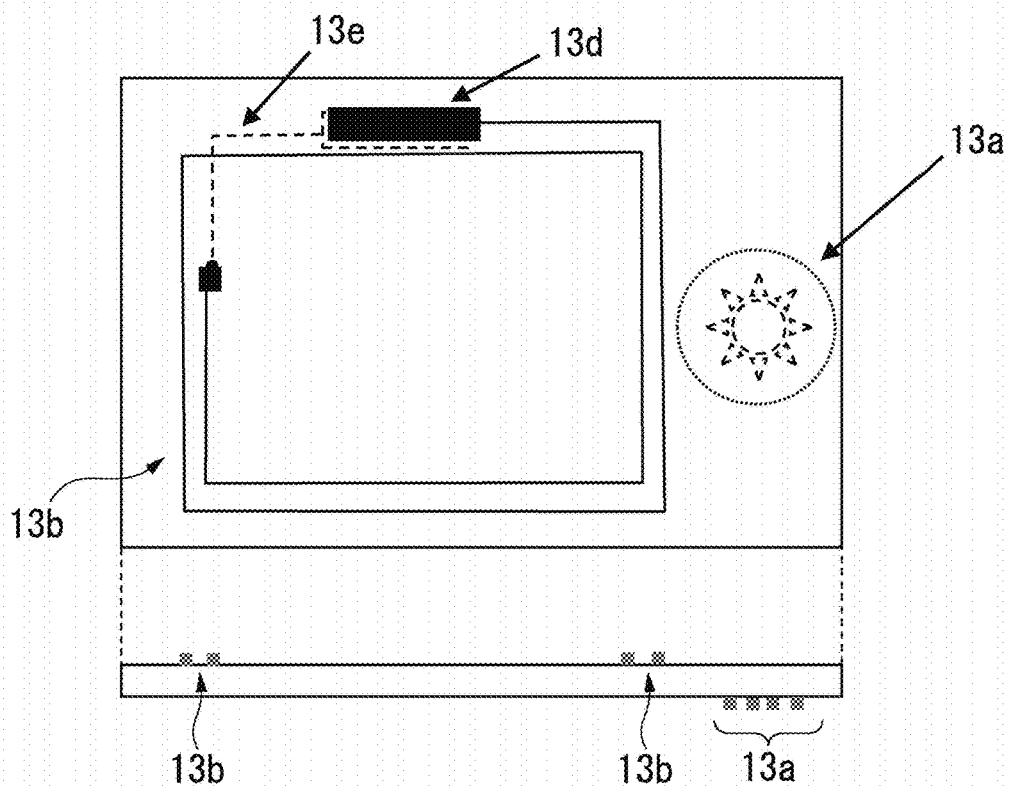
FIG. 15C is a schematic view showing an example of a decorative portion according to the second embodiment of the present invention.

In the example of the top view and the side view of FIG. 15C, the antenna coil 13b is formed on one surface of the decorative-portion, and the decorative portion 13a formed on the other surface (back surface) is formed in a linear positive pattern is formed. A condenser 13d is provided on the antenna coil 13b, and the condenser 13d is connected to the IC chip via a jumper wire 13e on the back surface, straddling the antenna coil, and via a connecting portion.

Figure 15D:
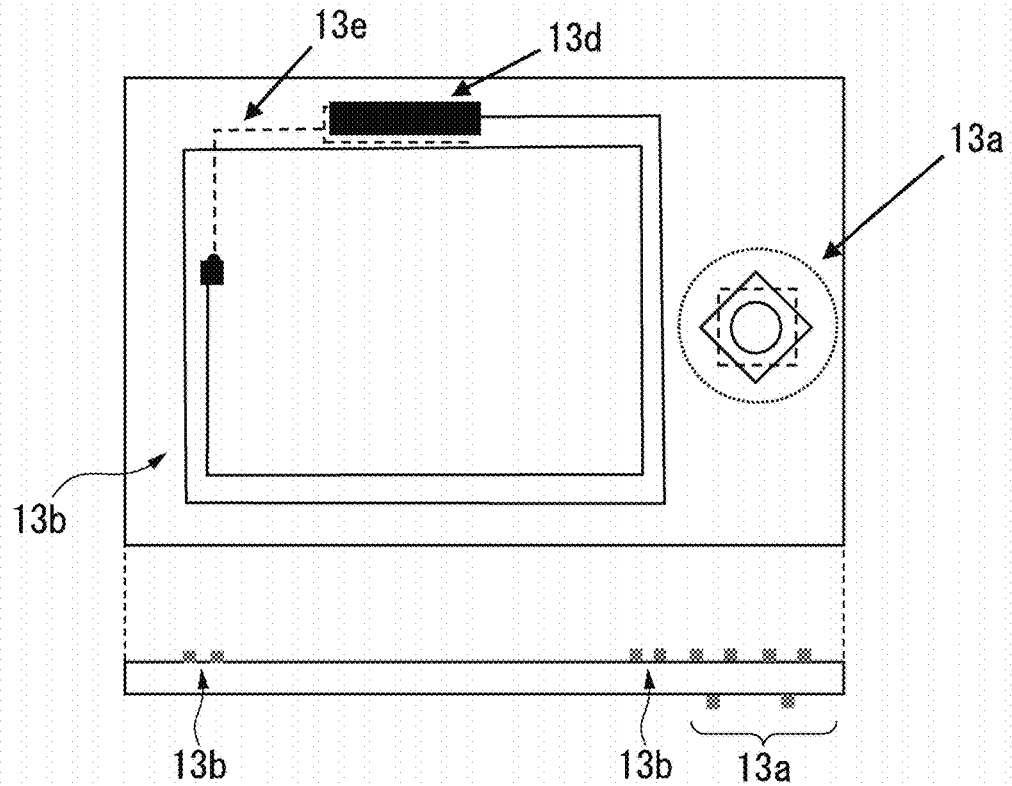
FIG. 15D is a schematic view showing an example of a decorative portion according to the second embodiment of the present invention.

In the top view and side view of FIG. 15D, a portion of the decorative portion 13a formed in a linear positive pattern and the antenna coil 13b are formed on one surface of the decorative-portion formation layer, and the other surface (a portion of the decorative portion 13a formed by a linear positive pattern is formed on the back surface), and the decorative portion 13a is formed by matching the patterns on the front and back surfaces. A condenser 13d is provided on the antenna coil 13b, and the condenser 13d is connected to the IC chip via a jumper wire 13e on the back surface, straddling the antenna coil, and via a connecting portion.

Similar to the first embodiment, the colored layer 4 can be provided between the laser marking layer 2 and the decorative-portion formation layer 13.

The colored layer 4 can be used as a layer for forming the design of the face of the ticket. Further, when the antenna is provided in the lower layer, the antenna can be concealed.

Similar to the first embodiment, the colored layer 4 has a window portion 4a for making the decorative portion 13a visible in the region overlapping the decorative portion 13a. By using the window portion 4a, the decorative portion 13a formed on the decorative-portion formation layer and the personal information marking portion 2a formed on the laser marking layer overlap with each other via the window portion 4a in the thickness direction of the layer. It can be displayed so as to overlap at least a portion of the personal information marking portion 2a and the decorative portion 13a and to be visually recognized. Therefore, it can be difficult to modify from the back surface.

Further, in the personal identification medium of the present embodiment, the same hinge layer 10 as that of the first embodiment can be provided.

Although the configurations of various personal identification media have been described above, the present invention is not limited thereto. For the arrangement configuration and form of each layer, these combinations and further modifications are possible.

A modified example of the personal identification medium of the present application will be described below.

Modification 1

In the second embodiment, as shown in FIG. 12 and the like, the decorative portion 13a and the antenna portion 13b are formed so as not to overlap each other.

However, the decorative portion 3a and a portion of the antenna portion 13b may be formed so as to overlap each other. Therefore, the personal information marking portion 2a overlaps with the decorative portion 13a and the antenna portion 13b via the window portion 4a.

Figure 16:
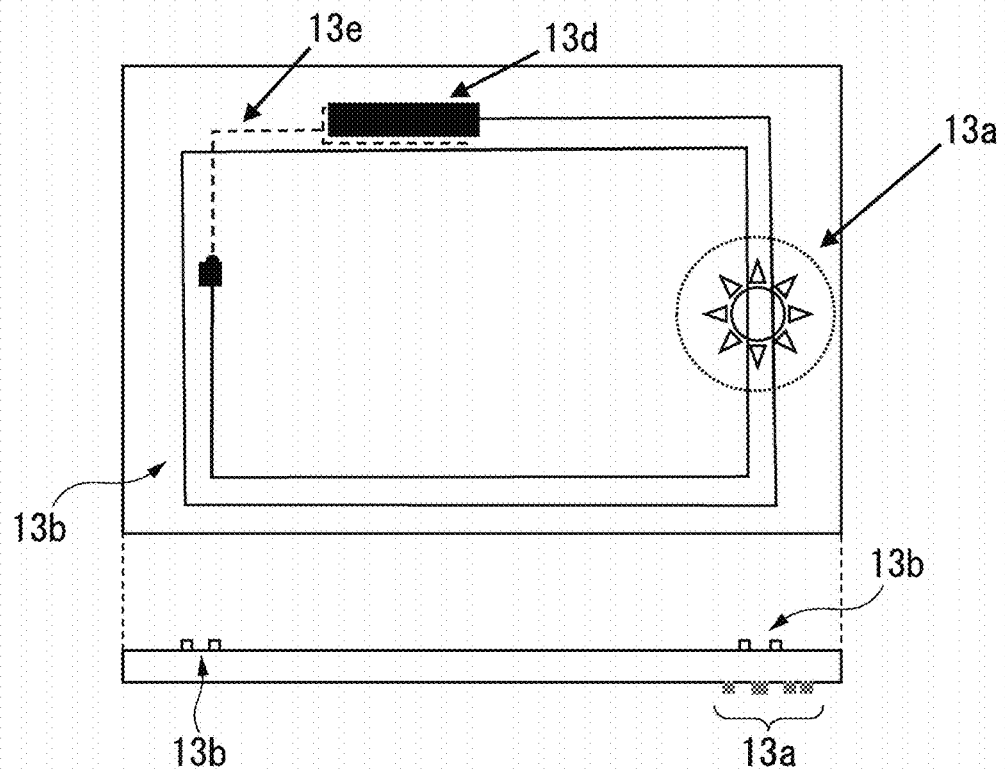
FIG. 16 is a schematic view showing a modified example of the decorative portion of the present invention.
Figure 17:
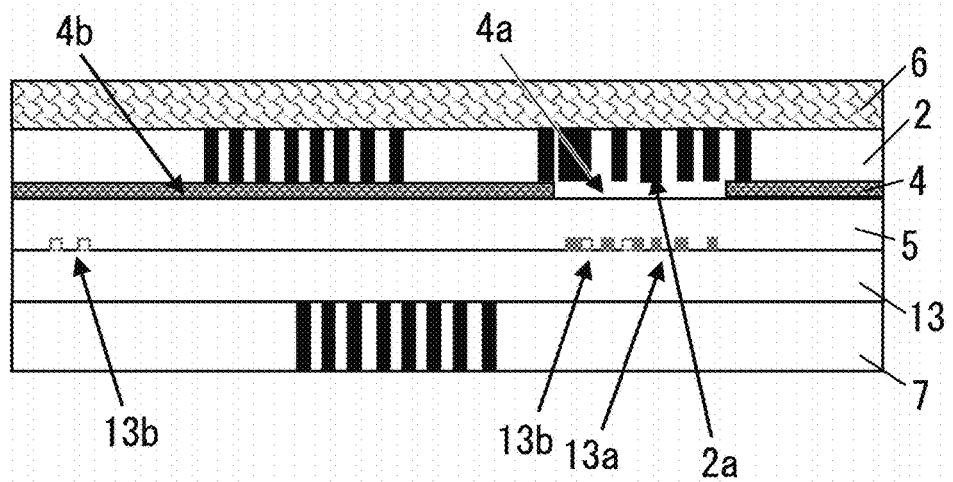
FIG. 17 is a cross-sectional view showing a modified example of the decorative portion of the present invention.

In this case, in the patterned metal thin-film layer, if the decorative portion 3a and the antenna portion 13b are formed on the same surface, a short circuit may occur. Therefore, the decorative portion 3a and the antenna portion 13b are formed on different surfaces (see FIG. 16). In the winding, the decorative portion 3a and the antenna portion 13b can be similarly formed on different surfaces or on the same surface (see FIG. 17).

In such a configuration, even if the personal information marking portion can be deleted from the back surface and another ID information can be provided, both the decorative portion and the antenna portion are in a destroyed state. Therefore, it is possible to visually confirm that the personal information has been tampered with from the destroyed state of the decorative portion of the antenna and the antenna portion, and also because the antenna portion is disconnected and non-contact communication becomes impossible. It can be confirmed that there was an unauthorized modification of personal information. Therefore, it can be difficult to modify from the back surface.

Modification 2

Not limited to the above embodiment, the patterned metal thin-film layer may be formed on both surfaces of the decorative layer.

Figure 18:
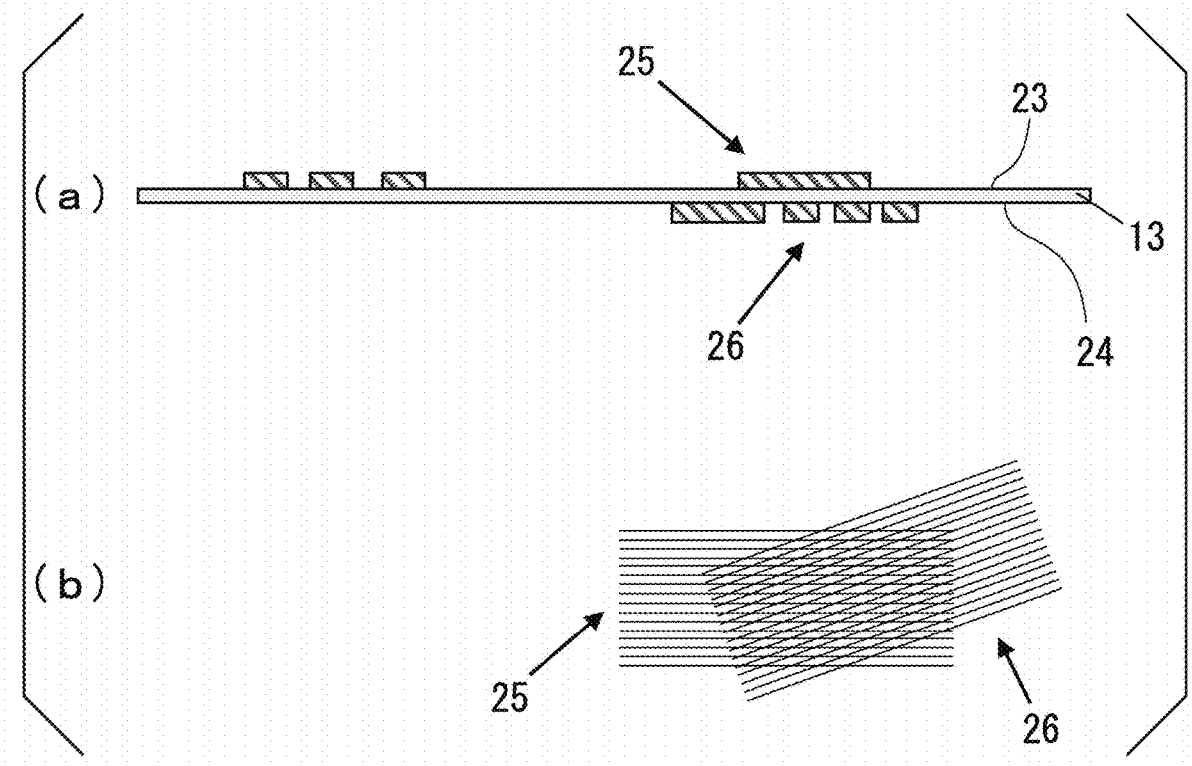
FIG. 18 is a schematic cross-sectional view showing a modified example of the decorative layer of the present invention.

As an example, part (a) of FIG. 18 shows an example in which a patterned metal thin-film layer is formed on both surfaces of the decorative layer 3. The first pattern 25 is arranged on the front surface 23 of the decorative layer 3, and the second pattern 26 is arranged on the back surface 24 opposite to the front surface so as to overlap at least a portion of the first pattern (see also part (b) of FIG. 18).

By providing the two patterns, a moiré pattern can be produced by the optical effect. Even if the decorative portion is tampered with, it is difficult to restore the moiré pattern once it has been modified, so the anti-counterfeiting effect can be enhanced.

The first pattern 25 and the second pattern 26 may be arranged on both surfaces of the decorative layer 3 by using windings, and a moiré pattern may be produced by an optical effect.

Modification 3

In addition to the layer structure of the above embodiment, the personal identification medium may have a plurality of layers having the same layer structure on the front surface and the back surface of the decorative layer.

Figure 19:
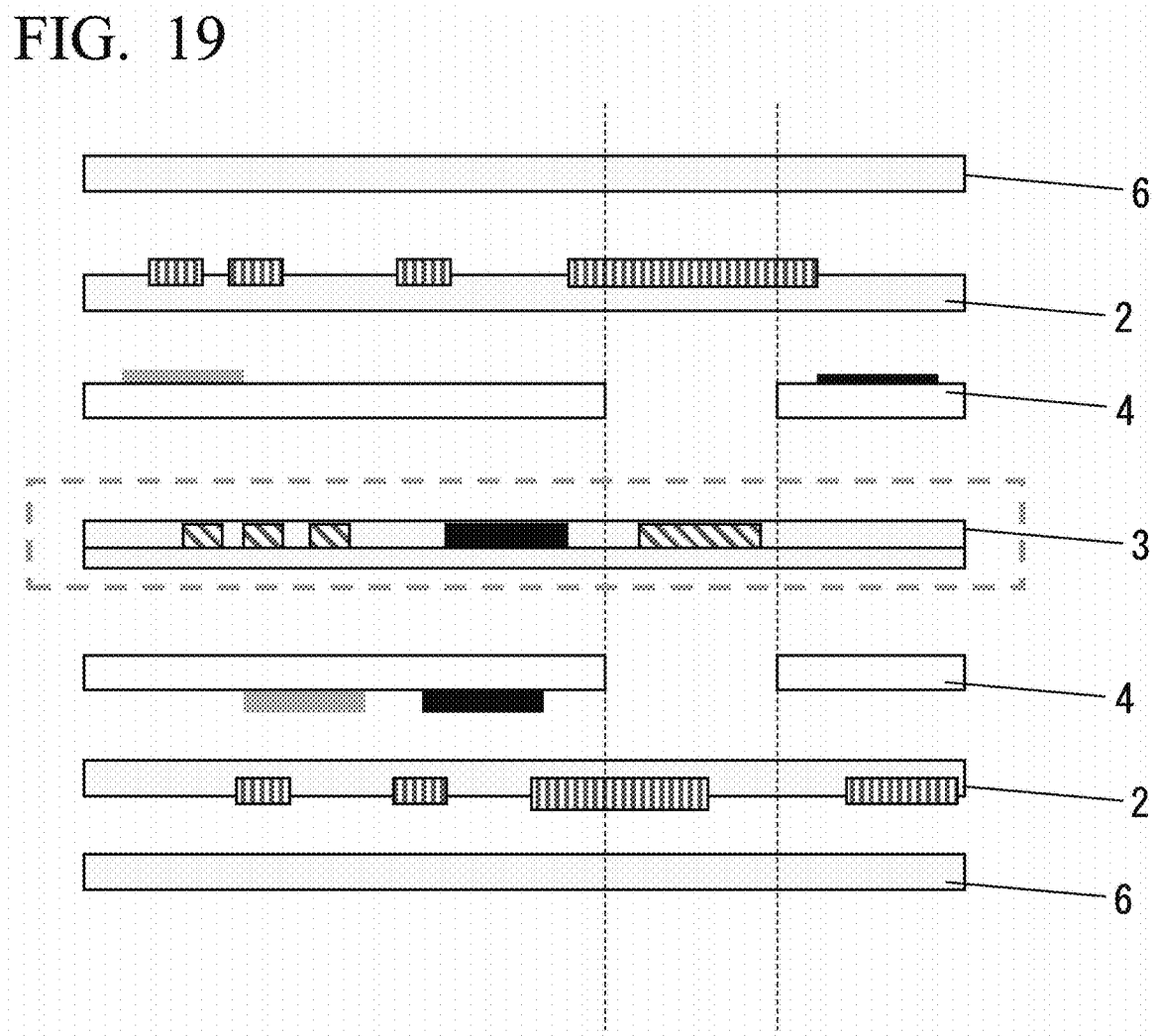
FIG. 19 is a cross-sectional view showing a modified example of the personal identification medium of the present invention.

For example, as shown in FIG. 19, a laser marking layer 2, a colored layer 4 having a window portion, and a light transmissive hologram layer 6 may be provided on both the front surface and the back surface of the decorative layer 3.

Modification 4

The formation order of each layer is not limited to the above embodiment.

Figure 20:
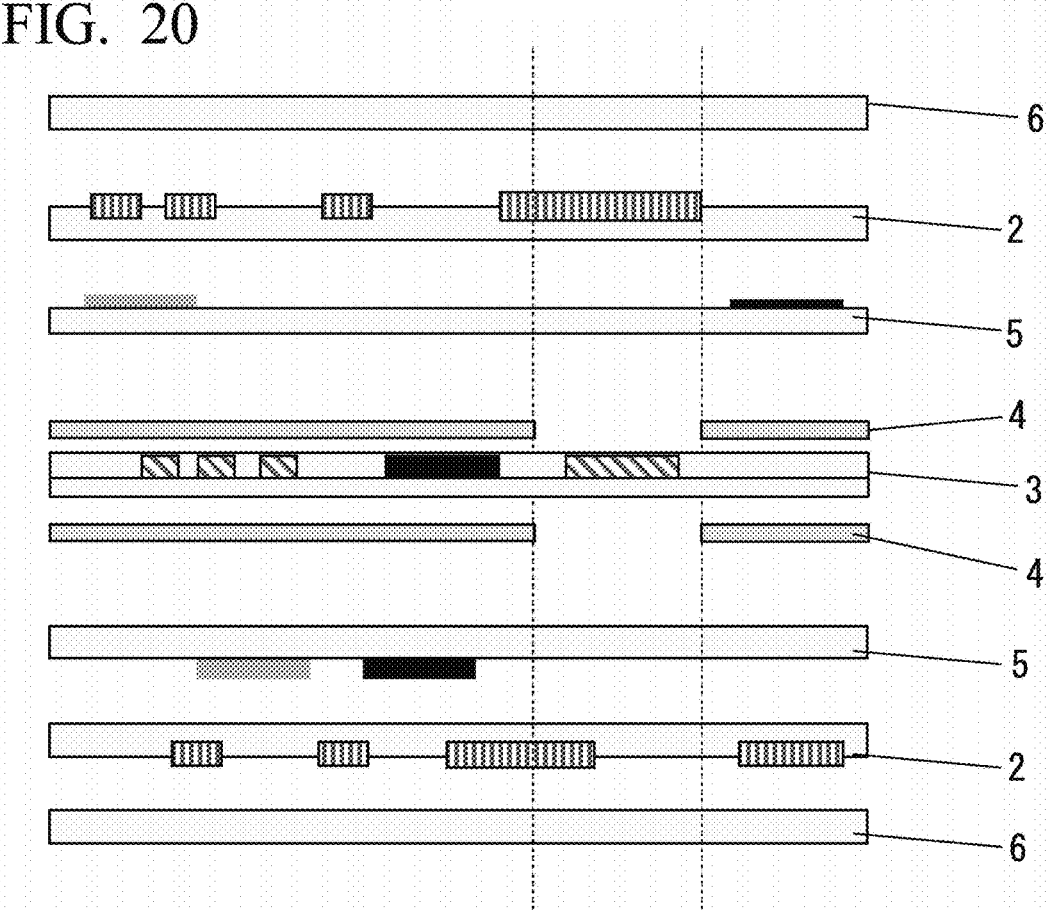
FIG. 20 is a cross-sectional view showing a modified example of the personal identification medium of the present invention.

For example, as shown in FIG. 20, a light transmissive energy resistant layer 5 may be provided between the laser marking layer 2 and the colored layer 4. In this case, if the thickness of the colored layer 4 is large, the effect of the step on the window portion affects the characteristics; however, if the thickness is small, the hiding property of the decorative portion is inferior. Therefore, the thickness of the colored layer 4 is preferably 20 to 75 μm, and more preferably 30 to 50 μm.

A plurality of transparent energy resistant layers 5 may be provided between the laser marking layer 2 and the colored layer 4. By forming the permeable energy resistant layer 5 in multiple layers, the area in contact with the upper and lower base materials is increased, and the adhesion between the upper and lower layers can be improved.

Figure 21:
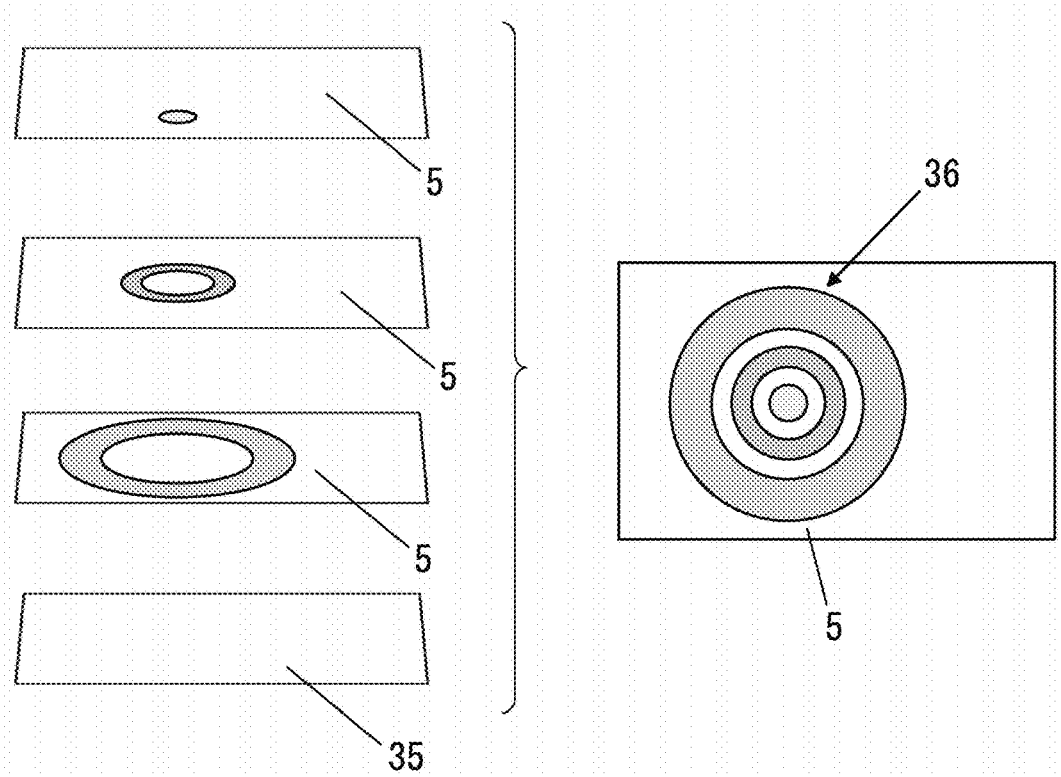
FIG. 21 is a schematic view showing an example of a multi-layered transmissive energy resistant layer of the present invention.

It is also possible to print on the transparent energy resistant layer 5. When the light transmissive energy resistant layer 5 is multi-layered as described above, delamination can be suppressed by dispersing a portion of the printed area in each light transmissive energy resistant layer. That is, as shown in FIG. 21, a portion of the print design is formed in each layer and laminated on the base material layer 35 so that the regions overlap to form one print design 36.

Modification 5

Figure 22:
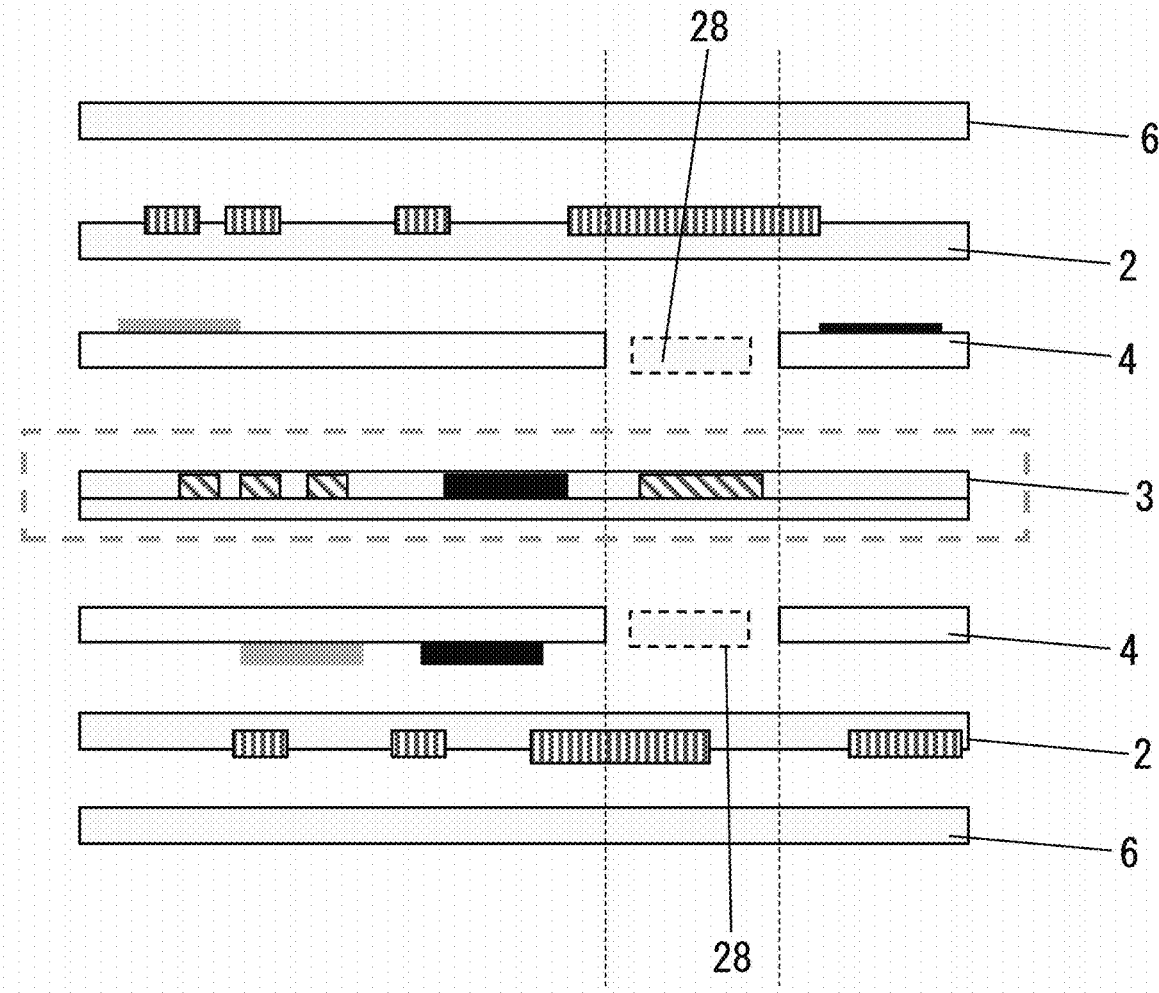
FIG. 22 is a cross-sectional view showing a modified example of the personal identification medium of the present invention.

As shown in FIG. 22, in the above layer structure, the window portion 4a of the colored layer 4 may be provided with a filling layer 28 for filling the step created by the window portion 4a. The filling layer 28 may be transparent or colored to the extent that the decorative portion 3a can be visually recognized. The thickness of the filling layer is preferably approximately 75% to 125% of the thickness of the colored layer 4 in order to alleviate the step between the layers.

Modified Example 6

Figure 23:
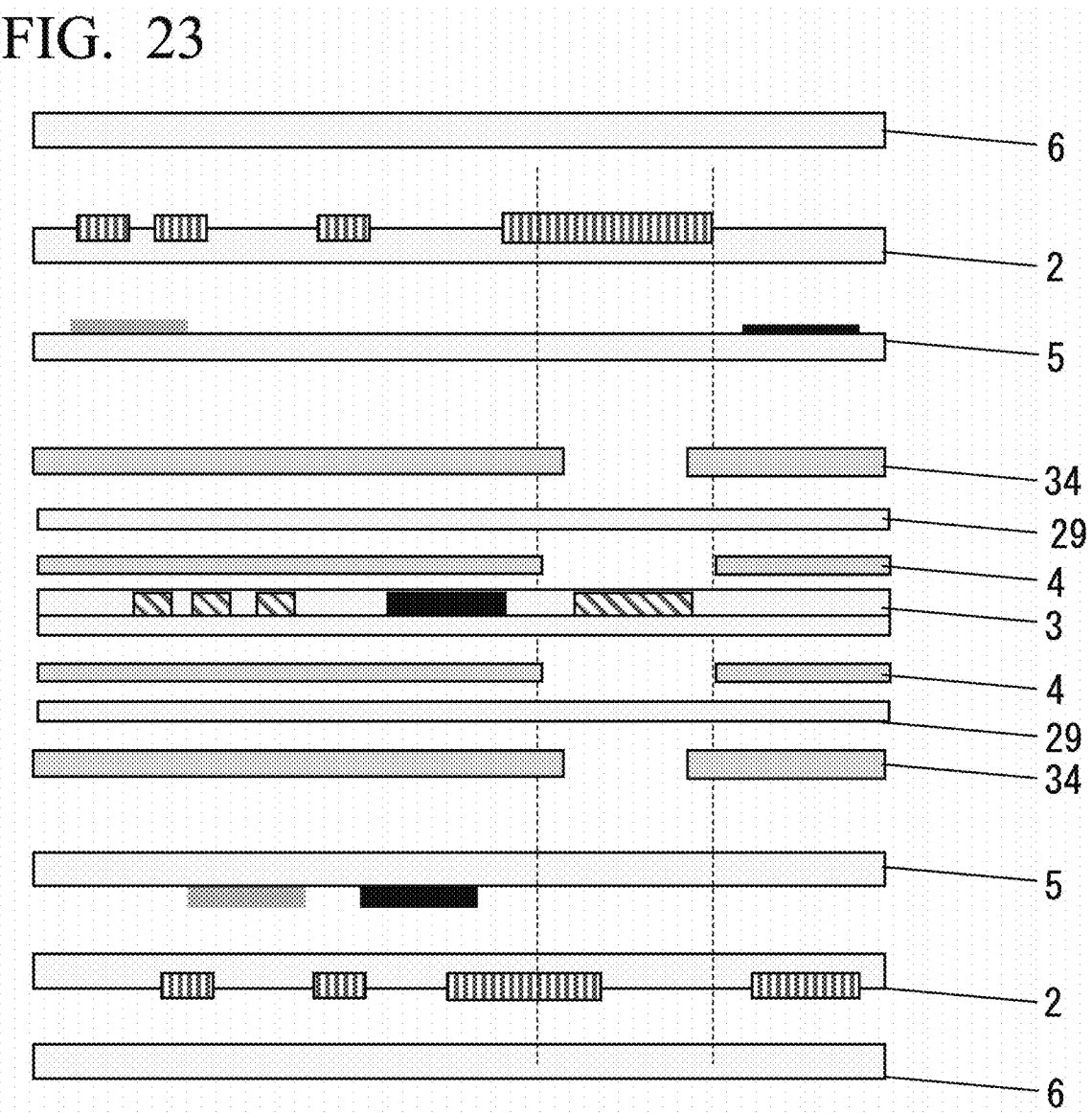
FIG. 23 is a cross-sectional view showing a modified example of the personal identification medium of the present invention.

As shown in FIG. 23, in the modified examples 3 and 4, the step absorption layer 29 may be provided on the colored layer 4, and another colored layer 34 may be further arranged. By sandwiching the step absorption layer between the colored layers, it is possible to absorb the step of the window portion and form a plurality of colored layers.

The step absorption layer 29 may be transparent or colored to the extent that the decorative portion 3a can be visually recognized. Furthermore, similarly to the colored layer, the thickness of the step absorption layer 29 is preferably 20 to 75 μm, and more preferably 30 to 50 μm.

In order to improve the step absorption function and maintain the strength of the step absorption layer 29, the window diameter of the window portion of the colored layer 4 is preferably greater than the window diameter of the window portion of the colored layer 34.

Even in the case of the present example, a plurality of transparent energy resistant layers 5 may be provided between the laser marking layer 2 and the colored layer 34. As described in the modified example 4, printing is also possible on the transmissive energy resistant layer 5, and by forming the layers, the area in contact with the upper and lower base materials can be increased, and the adhesion between the layers can be improved.

Modification 7

Although not shown, the decorative portion may also serve as a disconnection detection pattern. When an IC chip having a disconnection detection terminal in addition to the antenna terminal is used, a portion of the disconnection detection wiring or the disconnection detection wiring connected to the disconnection detection terminal of the IC chip may be used as a decorative portion. In this case, unlike the first embodiment, when the antenna is modified from the back surface, communication is possible because the antenna is not broken; however, since the wire for detecting the disconnection is broken, it can be confirmed by non-contact communication that the wire is broken.

What is claimed is:

1. A personal identification medium, comprising:
a decorative layer provided with a first portion including a fine line art pattern;
a laser marking layer, in which a personal information marking portion is marked, on the decorative layer;
a colored layer provided between the decorative layer and the laser marking layer; and
a light transmissive energy resistant layer provided between the colored layer and the decorative layer,
wherein
the decorative layer is formed of a material which is same as a material used for the light transmissive energy resistant layer,
the personal information marking portion formed on the laser marking layer overlaps at least a portion of the first portion formed on the decorative layer,
the colored layer comprises a colored portion and a window portion,
the window portion is formed in an area overlapping the first portion formed on the decorative layer, and
the personal information marking portion formed on the laser marking layer overlaps the first portion via the window portion.

2. The personal identification medium according to claim 1, wherein:
the decorative layer further comprises an antenna portion, and
the personal information marking portion overlaps a portion of the antenna portion.

3. The personal identification medium according to claim 1,
wherein the personal information marking portion is formed so as to straddle the window portion and the colored portion of the colored layer.

4. The personal identification medium according to claim 2,
wherein a filling layer is formed on the window portion.

5. The personal identification medium according to claim 1,
wherein the light transmissive energy resistant layer is both or one of an infrared absorption and scattering layer and a heat resistant layer.

6. The personal identification medium according to claim 1, wherein
a light transmissive hologram layer is further provided on the laser marking layer in which the personal information marking portion is marked, and
the light transmissive hologram layer is formed so as to cover at least a personal information marking portion.

7. The personal identification medium according to claim 1, wherein,
the decorative layer is provided with an antenna, and
the antenna includes a second portion including a linear pattern with the first portion connected to the second portion.

* * * * *

UNITED STATES PATENT AND TRADEMARK OFFICE
CERTIFICATE OF CORRECTION

PATENT NO. : 12,118,422 B2
APPLICATION NO. : 17/157578
DATED : October 15, 2024
INVENTOR(S) : Yoshiyuki Mizuguchi et al.

It is certified that error appears in the above-identified patent and that said Letters Patent is hereby corrected as shown below:

In the Claims

Column 20, Line 33:
In Claim 4, delete "2," and insert --1,--.

Signed and Sealed this
Thirty-first Day of December, 2024

Derrick Brent
*Acting Director of the United States Patent and Trademark Office*